United States Patent
Yoshikai et al.

(10) Patent No.: US 7,389,524 B2
(45) Date of Patent: Jun. 17, 2008

(54) IMAGE SYSTEM USING AN IMAGE SERVER CONTROLLER FOR GENERATING DISPLAY INFORMATION OF A CLIENT TO ACCESS IMAGES FROM PLURAL IMAGE SERVERS ON NETWORK

(75) Inventors: Tadashi Yoshikai, Fukuoka (JP);
Yasuaki Muranaka, Fukuoka (JP);
Tomoki Kawashima, Fukuoka (JP);
Masataka Tanaka, Fukuoka (JP);
Susumu Maetani, Fukuoka (JP);
Akihiro Nawata, Fukuoka (JP); Yuji Arima, Fukuoka (JP); Toshihiro Fujiki, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 368 days.

(21) Appl. No.: 11/311,186

(22) Filed: Dec. 19, 2005

(65) Prior Publication Data

US 2006/0168141 A1    Jul. 27, 2006

Related U.S. Application Data

(63) Continuation of application No. 09/952,107, filed on Sep. 14, 2001, now abandoned.

(30) Foreign Application Priority Data

Sep. 14, 2000  (JP)  ............................ 2000-279688
Oct. 3, 2000   (JP)  ............................ 2000-303362

(51) Int. Cl.
G06F 3/00 (2006.01)
(52) U.S. Cl. .......................... 725/48; 725/49
(58) Field of Classification Search ............ 725/48, 725/49, 109, 114, 98, 119; 705/26; 715/723; 345/635; 348/211; 709/250
See application file for complete search history.

(56) References Cited

U.S. PATENT DOCUMENTS

| | | | |
|---|---|---|---|
| 5,208,665 A * | 5/1993 | McCalley et al. | 725/119 |
| 5,845,084 A | 12/1998 | Cordell et al. | |
| 6,076,104 A | 6/2000 | McCue | |
| 6,182,116 B1 | 1/2001 | Namma et al. | |
| 6,310,601 B1 | 10/2001 | Moore et al. | |
| 6,320,600 B1 * | 11/2001 | Smith et al. | 715/723 |
| 6,456,305 B1 | 9/2002 | Qureshi et al. | |
| 6,538,663 B2 * | 3/2003 | Kamei | 345/635 |

(Continued)

FOREIGN PATENT DOCUMENTS

JP        08-263402       10/1996

(Continued)

*Primary Examiner*—Le Luu
(74) *Attorney, Agent, or Firm*—RatnerPrestia

(57) ABSTRACT

An image server and an image communication system capable of displaying images of plural image servers differing in IP address on a browser window by using a versatile browser, and a methods for controlling them. Plural image servers communicate with a client computer displaying image information presented from image servers through a network. Of the plural image servers, the controller of a certain image server receives a request from the client computer, and displays the image data of the image server and image data of other plural image servers simultaneously on the browser window of the client computer. Accordingly, the controller of the designated image server creates display information, and supplies the information to the client computer.

8 Claims, 28 Drawing Sheets

U.S. PATENT DOCUMENTS

| | | |
|---|---|---|
| 6,583,813 B1 | 6/2003 | Enright et al. |
| 6,590,586 B1 | 7/2003 | Swenton-Wall et al. |
| 6,711,552 B1* | 3/2004 | Kay et al. ............ 705/26 |
| 7,191,462 B1* | 3/2007 | Roman et al. ........... 725/98 |
| 2002/0016861 A1* | 2/2002 | Simonoff ............ 709/250 |
| 2002/0067412 A1* | 6/2002 | Kawai et al. ........... 348/211 |

FOREIGN PATENT DOCUMENTS

| | | |
|---|---|---|
| JP | 10-240456 | 9/1998 |
| JP | 11-164289 | 6/1999 |
| JP | 11-212889 | 6/1999 |
| JP | 11-196404 | 7/1999 |
| JP | 2000-069461 | 3/2000 |
| JP | 2000-148640 | 5/2000 |

* cited by examiner

FIG. 6

```
<HTML>

<BODY>
Setting
<!--#exec cgi="/cgi-bin/seta_disp.cgi"-->
</BODY>
</HTML>
```

FIG. 7

```
<HTML>

<BODY>
    <FORM ACTION="/cgi-bin/name_a_set.cgi"METHOD="GET">
        <BR>
          NAME Setting
        <BR>
        <INPUT TYPE="text"NAME="name_a"SIZE=10><BR>
        <INPUT TYPE="submit"VALUE="Set"><BR>
    </FORM>
</BODY>
</HTML>
```

FIG. 8

NAME Setting

```
[                    ]
[ Set ]
```

FIG. 9

```
<HTML>
<METAHTTP-EQUIV='PRAGMA'CONTENT='no-cache'>

Sample Imege=JAa and JCa
<P>
<img src=image/JAa.jpg width=320 height=240>
<P>
<img src=http: 192.168/0.52/image/JCa.jpg width=320 height=240>

</HTML>
```

FIG. 10
Sample Image = JAa and JCa
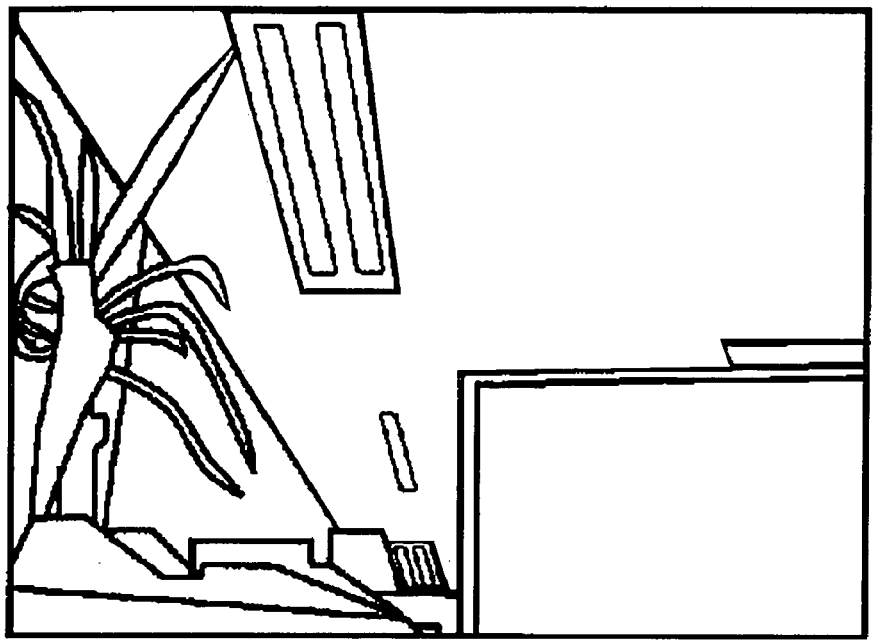
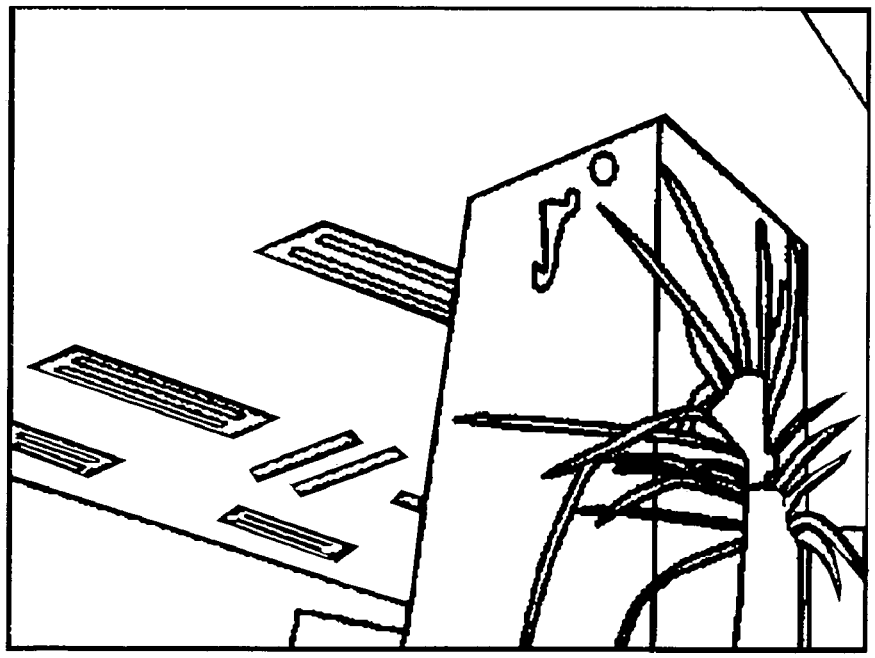

FIG. 11

```
<HTML>
Sample Imege=JAa and JCa
<P>
<img src=image/JAa.jpg width=320 height=240>
<P>
<img src=http://192.168.0.52/image_cgi/JCa.cgi?ID=ABC&Password=123
 width=320 height=240>

</HTML>
```

P1H Shot Mode top Page
• Image Mode ⇔ PAN ⇨ Expand Reduce

- Resolution 640×480
  320×240
  160×120

- Compression  High Mid Low
- Bright,Color  • Initial Setting
- Help

- Image Mode

FIG. 24
■ Image Mode Select
- Client Pull Mode 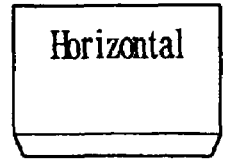 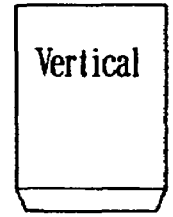
● Pull span ▢ Sec
- Server Push Mode 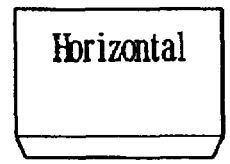 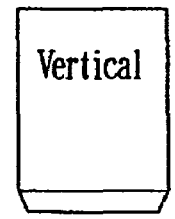
  For Netscape only
- Java Applet Mode 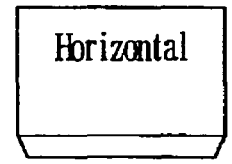 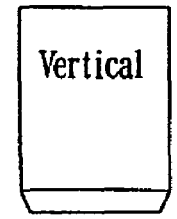
  For Internet Explorer
  And Netscape
- Snap Shot Mode 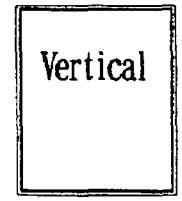
● Stored Image
● Several Picture 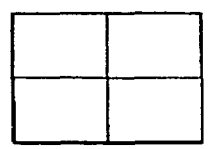 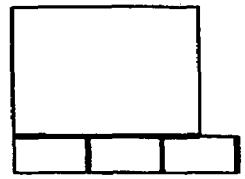
  (Master and Sleve Camera Image)
● Ininitial Setting
● Help FIG. 25
P1K Several Image Top Page-1  (Same Size)
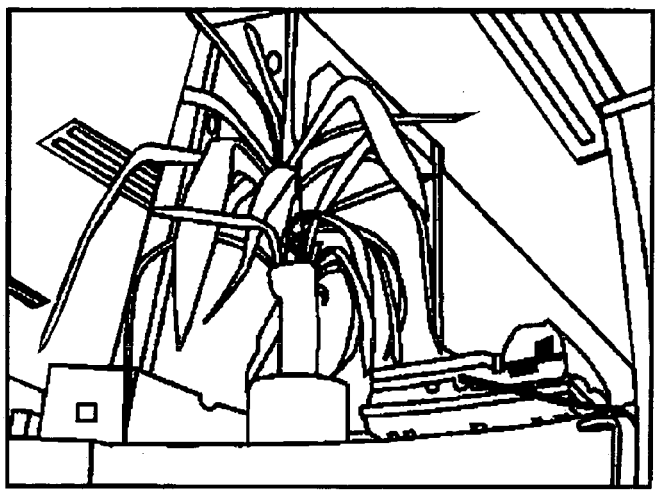
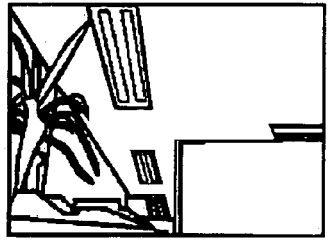 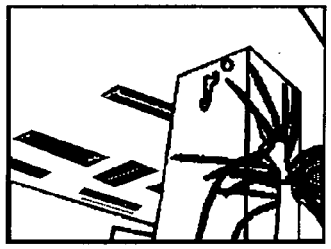 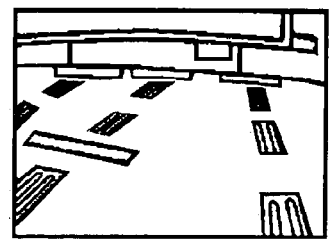
- Several Image Setting
- Image Mode
- Help

FIG. 26

P2J Several Image Setting

- Image Size      [Same ⇕]
- 1st Priority Camera   [1 ⇕]
- Slave IP Camera Registration

| IP Address [ ] | Enable ☐ | Password [ ] | Name [ ] |
|---|---|---|---|
| IP Address [ ] | Enable ☐ | Password [ ] | Name [ ] |
| IP Address [ ] | Enable ☐ | Password [ ] | Name [ ] |
| IP Address [ ] | Enable ☐ | Password [ ] | Name [ ] |
| IP Address [ ] | Enable ☐ | Password [ ] | Name [ ] |
| IP Address [ ] | Enable ☐ | Password [ ] | Name [ ] |
| IP Address [ ] | Enable ☐ | Password [ ] | Name [ ] |
| IP Address [ ] | Enable ☐ | Password [ ] | Name [ ] |
| IP Address [ ] | Enable ☐ | Password [ ] | Name [ ] |
| IP Address [ ] | Enable ☐ | Password [ ] | Name [ ] |

- ● Help
- ● Several Image Page
- ● Client Top Page

IMAGE SYSTEM USING AN IMAGE SERVER CONTROLLER FOR GENERATING DISPLAY INFORMATION OF A CLIENT TO ACCESS IMAGES FROM PLURAL IMAGE SERVERS ON NETWORK

This application is a Continuation of U.S. patent application Ser. No. 09/952,107 filed Sep. 14, 2001 now abandoned.

FIELD OF THE INVENTION

The present invention relates to a network in which plural image servers communicate with a computer terminal for displaying the image information presented from the image servers, and more particularly to an image server capable of being controlled so that images of plural image servers may be displayed simultaneously on a computer screen, an image communication system, and control methods thereof.

BACKGROUND OF THE INVENTION

In a recent network image communication system, image servers storing images taken by plural cameras are installed at plural positions, these image servers are connected through the Internet, and the image of each image server can be observed by a computer terminal at the center (hereinafter called client PC). This system is widely used as camera system or monitor system and the like.

FIG. 27 is a block diagram showing a conventional camera system.

In FIG. 27, the camera system is composed of image servers 702 to 705 for storing images taken by cameras, a client PC 701 observing the images of image servers as the center, and a local area network (LAN) 716 for connecting them.

The image servers 702 to 705 are identical in configuration. Each one of the image servers 702, 703, 704, and 705 has a mutually different IP address, and the user specifies the IP address, so that the client PC 701 takes in the image of the image server of the specified IP address.

The image server 702 is composed of an image server controller 706, a memory 707, a LAN interface unit 708, an image input unit 709, and an image data creator 710.

The image server controller 706 controls the entire image server 702.

The memory 707 includes an HTML data storage 7071 for storing web pages, an image data storage 7072 for storing image data taken by camera, and a user setting information storage 7073 for storing various data specified by the user.

The LAN interface unit 708 is an interface for connecting to the LAN.

The image input unit 709 receives an image signal v taken by a camera (not shown in FIG. 27) of the image server 702.

The image data creator 710 creates image data in JPEG or other formats from the image signal sent from the image input unit 709.

The LAN interface unit 708 is an interface for connecting to the LAN.

The client PC 701 includes a PC controller 711 for controlling the entire computer system, an input unit 712 for entering or manipulating various data, a display unit 713 for displaying image data from the image servers 702 to 705, a memory 714, and a LAN interface unit 715 for connecting to the LAN. Herein, the memory 714 includes a browser storage 714a for storing browser or other browsing software and the like.

The operation of the camera system is explained by referring to FIG. 28.

FIG. 28 is a flowchart showing the operation of the conventional camera system.

In FIG. 28, when the image server controller 706 judges that the signal designating the IP address is received from the client PC 701 (S141), the image server controller 706 acquires the HTML data for initial image which is the home page information from the HTML data storage 7071 of the memory 707, and transmits the data to the client PC 701 (S142). The client PC 701 requests transmission of image data according to the HTML data for initial image.

When the image server controller 706 judges that a transmission request of image data is received (S143), the image server controller 706 takes in the image data from the image data storage 7072 of the memory 707, and transmits the data to the client PC 701 (S144).

At step S143, if image data is not requested, and it is judged that transmission request of other data than image data is received from the client PC 701 (S145), the image server controller 706 takes in the requested data from the memory 707, and transmits the information according to the request to the client PC 701 (S146).

When the image server 703, 704, or 705 is accessed from the client PC 701, each image server operates in the same manner.

In the conventional camera system, if desired to display images of image servers of plural different IP addresses on the screen of the client PC 701, each one of the image servers needs to be accessed.

Specifically, from the started browser, the IP address of only one image server can be accessed, and the browsers as many as the number of image servers to be displayed needs to be started, and the IP addresses as many as the number of image servers needs to be accessed individually.

Therefore, to display images of image servers of plural different IP addresses on one screen, the exclusive browser software for arranging images of plural browsers started on the screen as desired by the user, and for observing the images of plural image servers simultaneously on the screen, needs to be installed in the client PC.

To create such exclusive software, the user is required to have an advanced professional knowledge.

Using the exclusive software, as mentioned above, it is possible to display images of image servers of plural different IP addresses on the one screen, but it is costly to create such exclusive software. If the exclusive software is not free, the user's expenses are increased.

If general public users desire to observe images of image servers of plural different IP address on one browser window screen, the images are displayed only in computers in which the exclusive software is installed, and general public users not having computer with installed exclusive software cannot observe the images of image servers.

SUMMARY OF THE INVENTION

The present invention addresses the above problems, and it is hence an object of the invention to present an image server for being controlled to display plural images on one screen by using a versatile browser software, an image communication system, and methods for controlling them.

In plural image servers of the invention for communicating with a client PC for displaying image information presented from image servers through a network, a) An image data creator creates image data.

b) A web server communicates with other devices on the network.

c) A connection information storage stores display information including the information of connection destination of other image servers than the own image server.

d) A setting information storage stores various setting information.

e) An image server controller controls the image data creator, connection information storage, and setting information storage, and creates display information.

Further, the image server controller creates, corresponding to the request from the client PC, display information so that the image data created in the image data creator, and image data of other plural image servers may be simultaneously displayed on the browser window of the client PC, and supplies them to the web server.

In the invention, the image server is controlled to record the display information including the connection destination of other image servers than the own image server, and transmit the display information for displaying the image of plural image servers other than the specific image server according to the request from the client PC. Therefore, when the web page of the image server is requested from the client PC, the image server transfers the connection information capable of demanding the images of the image servers having plural different IP addresses to the client PC. As a result, the client PC requests individual images to plural image servers from one browser, and displays plural received images on one browser window.

Therefore, as described herein, the user does not have to access plural image servers, and can receive image data from other plural image servers by accessing a specific image server by using a versatile browser software.

The image communication system of the invention includes these image servers, a client PC, and a network.

The control method of the image communication system of the invention includes the following steps:

a) When a specified request is sent from the client PC to the image server, the display information excluding image data is transmitted from the image server to the client PC.

b) A desired image server is specified based on the connection information included in the display information, and an image data request signal for requesting image data is transmitted from the client PC.

c) At least one of the image data of the image server and image data of other image servers is transmitted from the image server to the client PC according to the image data request signal.

BRIEF DESCRIPTION OF THE DRAWINGS

FIG. 6 shows an example of HTML data requesting start of CGI program presented from the image server in FIG. 1 and FIG. 2.

FIG. 7 shows an example of HTML data requesting start of CGI program presented from the image server in FIG. 1 and FIG. 2.

FIG. 8 shows an example of HTML data displaying setting input unit and set value transmission input presented from the image server in FIG. 1 and FIG. 2.

FIG. 9 shows an example of HTML data requesting images of plural image servers presented from the image server in FIG. 1 and FIG. 2.

FIG. 10 shows an example of image display by HTML data requesting images of plural image servers presented from the image server in FIG. 1 and FIG. 2.

FIG. 11 shows an example of HTML data requesting automatic validation presented from the image server in FIG. 1 and FIG. 2.

FIG. 24 shows a image mode display.

FIG. 25 shows a display of plural images.

FIG. 26 shows a setting image of plural images.

DESCRIPTION OF THE PREFERRED EMBODIMENTS

Figure 1:
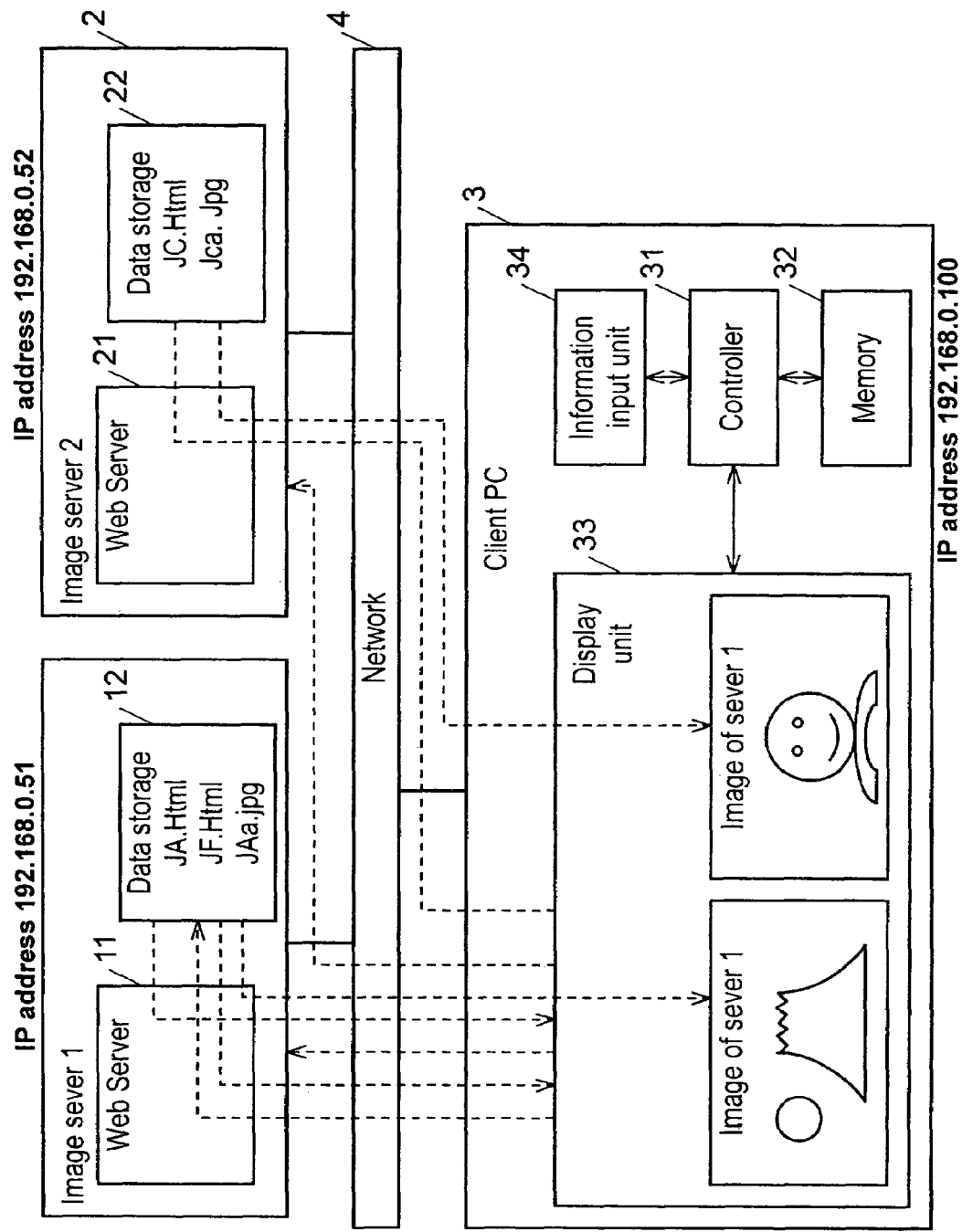
FIG. 1 is a structural diagram showing a network image communication system in embodiment 1 of the invention.

Referring now to the drawings, preferred embodiments are described below.

Embodiment 1

FIG. 1 is a structural diagram showing a network image communication system in embodiment 1 of the invention.

In FIG. 1, the network image communication system includes image servers 1, 2 having different IP addresses and storing image data, a computer (client PC) 3 for observing images of image servers as the center, and a network 4 for connecting them.

The client PC 3 can obtain and display the images from the image servers 1, 2 through the network 4.

The image servers 1, 2 include web servers 11 and 21 for supplying web pages, and data storages 12 and 22 for storing image data, connection information, and various setting information.

The client PC 3 includes a controller 31 for controlling the entire client PC, an operation memory 32 used for operation of the controller 31, a display unit 33 for displaying images, and an information input unit 34 such as keyboard and mouse.

The operation memory 32 is a memory storing a program and its data, and a program and data for realizing the browser function are also stored herein.

In the network image communication system shown in FIG. 1, the operation is explained below.

The user enters a URL in one browser window displayed on the screen of the client PC 3 having, for example, IP address 192.168.0.100, and specifies JF.HTML data in HTML data created by the image server 1. In the JF.HTML data, JAa.jpg of the data storage 12 of the image server 1 is described, and it is also described to request and display JCa.jpg of the data storage 22 of the image server 2 having IP address 192.168.0.52. By this description, from the browser accessing the image server 1 having IP address 192.168.0.51, it is possible to access also the image server 2 of IP address 192.168.0.52, to request it to return JCa.jpg image data therein, and to display the JCa.jpg image data in the same screen of the browser.

Thus, as shown in the display unit 33 of the client PC 3 in FIG. 1, images of image servers having plural different IP addresses can be displayed at the same time.

The detail of the image server 1 is explained.

Figure 2:
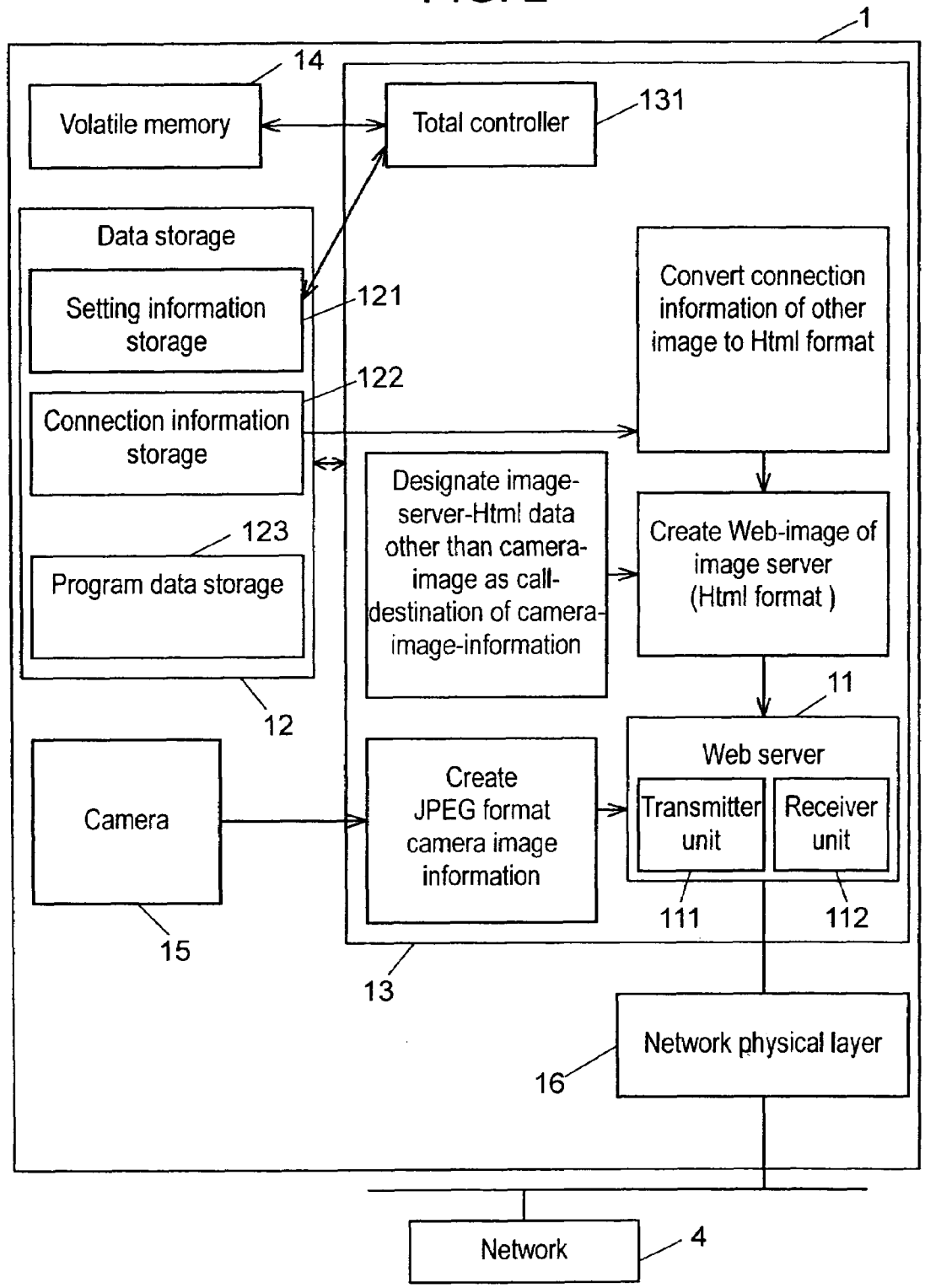
FIG. 2 is a block diagram of image server in embodiment 1 of the invention.

FIG. 2 is a block diagram of image server 1 in embodiment 1 of the invention.

In FIG. 2, the image server 1 contains a web server 11, a data storage 12, a controller 13 for controlling the entire image server, a volatile memory 14 such as a RAM, a camera 15, and a network physical layer 16 for connecting to the network 4. Herein, the controller 13 controls the entire image server by means of a total controller 131.

The web server 11 includes a transmitter unit 111 and a receiver unit 112 for communicating with the client PC 3 on the network.

The data storage 12 is a nonvolatile memory, and includes a setting information storage 121 for storing various setting information of the image server 1, a connection information storage 122 for storing connection information of other image servers than the image server 1, and a program data storage 123 for storing program and its data. The controller 13 converts the connection information of other image server than the image server 1 into HTML format, superposes the call destination of image data of the camera 15 on the data other than image (for example, message or text information), creates a web page of HTML format of the image server 1, and supplies the web page to the web server 11.

The controller 13 converts the image signal of the camera 15 into an image of JPEG format, and outputs the image to the web server 11.

The web server 11 sends out the HTML format web page and image data to the network 4 through the network physical layer 16 according to the request from the client PC 3.

Figure 4:
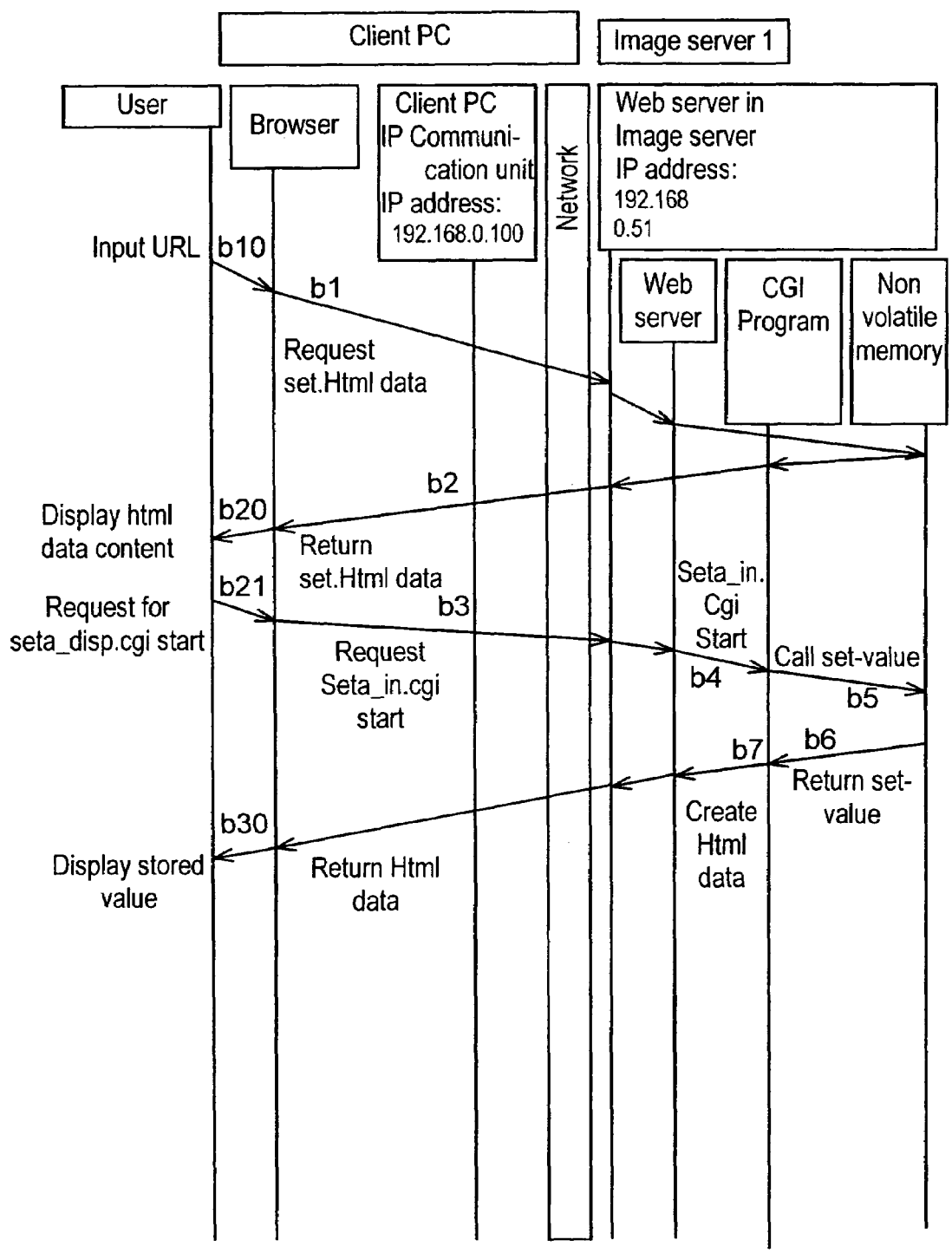
FIG. 4 explains a method of displaying data stored in a data storage of image server on a screen of client PC by user operation.

FIG. 4 explains a method of displaying data stored in the data storage 12 of image server 1 (herein after called "storage value") on the screen of client PC 3 by user's operation.

In FIG. 4, the user enters a URL, and designates the setting screen of the image server 1 (b10). The browser of the client PC 3 requests set.HTML data to the image server 1 according to the designation (b1).

Receiving this, the image server 1 returns set. HTML data stored in the data storage 12 to the client PC3 (b2).

Herein, the content of HTML data is displayed (b20). According to the description of HTML, the user requests starting of seta_disp.cgi program of the image server 1 (b21). Start of seta_disp.cgi program is requested when the description as shown in FIG. 6 is contained in the description of set.HTML.

The browser of the client PC 3 requests the image server 1 to start seta_disp.cgi program in the data management directory named cgi-bin according to the standard of the HTML data format (b3).

Receiving this request, the image server 1 starts seta_disp.cgi stored in the data storage 12 (b4).

The seta_disp.cgi program fetches the present set value stored in the data storage 12 (b5), and acquires it (b6).

Then, the seta_disp.cgi program creates HTML data of the setting image based on this present set value, and returns it (b7).

According to the description of the HTML data, the setting image describing the present set value, that is, the storage value is displayed (b30).

Figure 5:
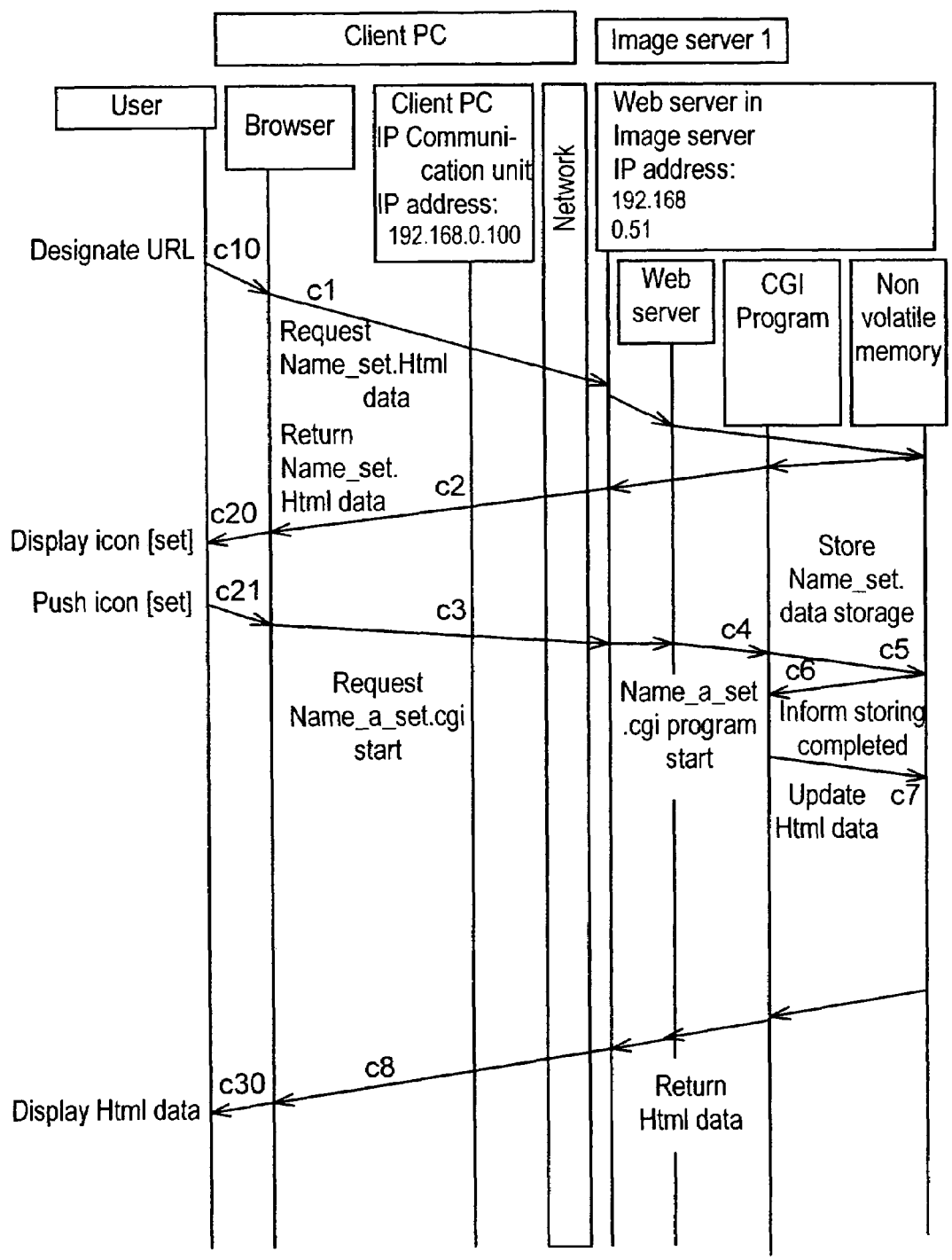
FIG. 5 explains a method of storing the value entered from an input unit of client PC 3 in data storage of image server.

FIG. 5 explains a method of storing the value entered from information input unit 34 of client PC 3 in data storage 12 of image server 1.

In FIG. 5, the user enters a URL, and designates the setting image of the image server 1 (c10).

The browser of the client PC 3 requests Name Set.HTML data to the image server 1 according to the designation (c1).

Receiving this request, the image server 1 returns the designated HTML data stored in the data storage 12 to the client PC 3 (c2).

Figure 8:
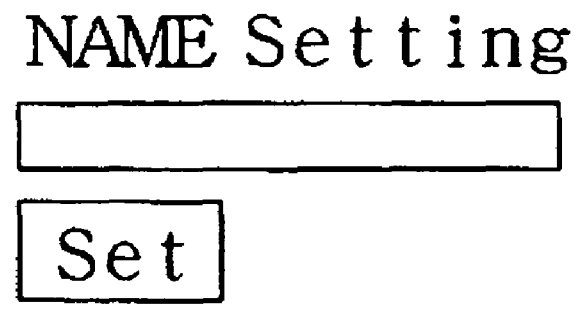

The designated HTML data (see FIG. 7) contains a setting value input frame and an icon [Set] for transmitting the setting value as shown in FIG. 8, and the browser of the client PC 3 displays it (c20). The user enters the set value into the input frame by the input unit 34, and press the icon [Set] (c21). At this time, the browser of the client PC 3 adds the entered set value, that is, the input value, and requests the image server 1 to start 'name a set.cgi' program in the data management directory 'cgi-bin' according to the standard of the HTML data format.

The image server 1 takes in the input value as variable 'name a' on the cgi program (c3). Receiving it, the image server 1 starts up 'name a set.cgi', and executes 'name a set.cgi' program by using the variable 'name a' therein as the input value (c4). The program of 'name a set.cgi' stores the input value in the data storage 12 (c5). When stored completely (c6), the cgi program updates the HTML data of the setting image based on the stored set value, and returns the data to the client PC 3 (c7, c8).

Consequently, the client PC receives and displays the HTML data in which the set value is a part of display characters of the data (c30).

In this way, the information (characters and numerical values) entered from the client PC 3 can be stored in the data storage 12 of the image server 1, and the HTML data having the effects of the entered information can be fed back to the display in the client PC 3.

Explained next is a method by which the user stores the connection information of the image server other than the image server 1 from the browser of the client PC 3 into the connection information storage 122 of the data storage 12 in FIG. 2.

The connection information of other image server than the image server 1 includes the IP address of the image server, proper names of place of installation and the like, password, presence or absence of display, image size, etc.

The browser of the client PC 3 designates the connection destination entry image according to the URL of the connection destination entry image of the image server 1, and requests HTML data thereof. Receiving this, the image server 1 returns the HTML data requesting input of connection information to the client PC 3. The entered connection information data is returned from the client PC 3, and stored in the data storage 12.

The image server 1 creates the HTML data reflecting the connection information of other imager server than the image server 1 in the same manner as explained in FIG. 5.

That is, the image server 1 takes out the connection information from the connection information storage 122 in the data storage 12. The image server 1 takes out the HTML data of this image server (setting image, and other image information than camera images) and the image storage position of this image server, from the setting information storage 121 of this image server main body. Thus, the image server 1 creates, as a HTML file, the web page for displaying images taken by the camera of plural image servers on the screen of the client PC 3 as HTML file.

The HTML data created herein is shown in FIG. 9. FIG. 9 shows images of image servers differing in IP address so as to be requested from the browser.

Specifically, in FIG. 9, the description for requesting and displaying image data JAa.jpg in the image server 1 is shown below.

img src=image/JAa.jpg

The description for requesting and displaying image data JCa.jpg in the image server 2 of different IP address 192.168.0.52 is shown below.

img src=http://192.168.0.52/image/JCa.jpg

By this HTML data description, the browser operates according to the specification of the HTML data format, and two images are displayed as shown in FIG. 10.

The HTML data thus described so as to display images of plural image servers differing in IP address on the same screen of the browser is created as explained above, and stored in the data storage 12 in FIG. 2 as JF.HTML.

A flow of signal between the client PC 3 and image servers 1 and 2 is explained below.

Figure 3:
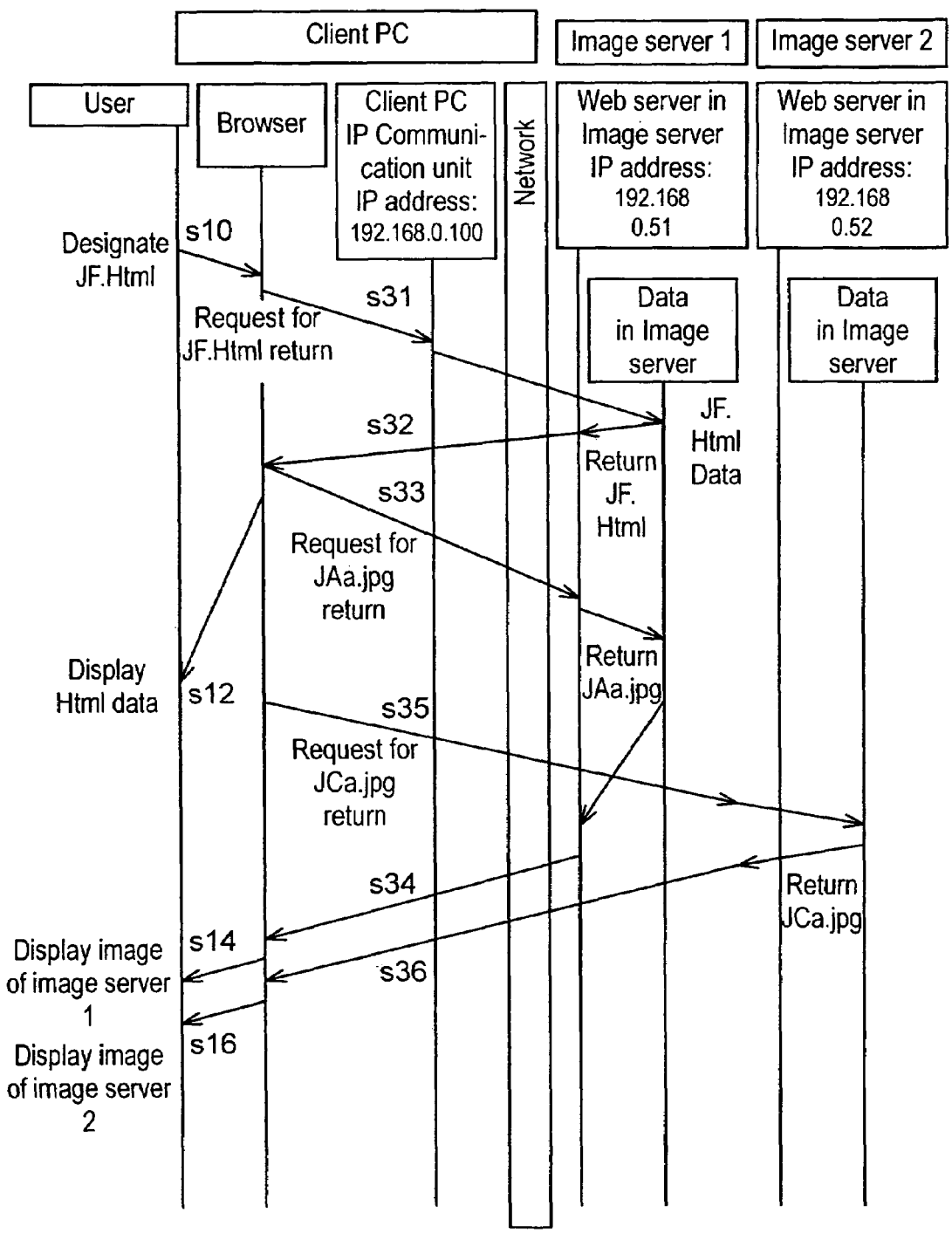
FIG. 3 explains flow of signal between client PC 3 and image server.

FIG. 3 is a diagram explaining the flow of signal between the client PC 3 and image servers 1 and 2.

In FIG. 3, the user starts up the browser, and designates the JF.HTML stored in the data storage 12 of the image server 1 according to the URL (S10). The browser requests the image server 1 of IP address 192.168.0.51 to return the JF.HTML (S31).

This JF.HTML is described to request plural image servers differing in IP address to make a connection based on the client setting, and it is created in the image server 1.

Receiving this, the image server 1 of IP address 192.168.0.51 sends back JF.HTML (S32).

At this time, the content of HTML data such as text is displayed (S12).

The content of the JF.HTML is shown in FIG. 9.

Receiving this, the browser of the client PC 3 requests image data of JAa.jpg from the image server 1 of IP address 192.168.0.51, based on the specification of the HTML data format (S33).

The image server 1 returns it (S34).

The browser of the client PC 3 requests image data of JCa.jpg from the image server 2 of IP address 192.168.0.52 (S35).

The image server 2 returns it (S36).

As a result, images of plural image servers different in IP address set as the image server are displayed simultaneously on one browser window of the client PC (S14, S16).

Alternatively, the JF.HTML data may be created outside of the image server 1, and transferred and stored in the image server 1.

The data storage 12 may be also designed to store proper names such as the place of installation of plural servers together with the connection information of plural image servers.

Thus, in this case, since the HTML data based on a proper name set by the client is created in the image server as above explained, the proper names are also displayed together with the image.

In the HTML data, the display positions of characters and images can be also designated by the specification of the HTML data format. When creating the HTML data including proper names, by creating the HTML data so as to be displayed at adequate positions related to the image display positions, the image names can be displayed so as to be understood easily on the browser screen.

Passwords of plural image servers may be also stored.

When requesting image data to the image server and displaying the image on the browser window, if password validation is demanded of the image data requesting side, in the case of displaying images of plural image servers differing in IP address on one browser window, it is required to enter the password for every one of the plural image servers and return it, and the operation is complicated.

A method of returning the passwords automatically to plural image servers is explained below.

To return the passwords automatically, the passwords of plural image servers differing in IP address are stored in the image server 1.

The diagram in FIG. 9 is modified as shown in FIG. 11.

In FIG. 11, an example of HTML data describes the JAa.jpg data of the image server 1 as follows:

img src=image/JAa.jpg width=320 height=240

Next, when requesting JCa.jpg of IP address 192.168.0.52 of the image server 2, in the same way as explained in FIG. 6 and FIG. 7, the description for starting the CGI program is added.

For this purpose, the description is as follows.

img src=http://192.168.0.52/image cgi/
    JCa.cgi?ID=ABC & Password=123

Of this description, the JCa.cgi program, img src=http://192.168.0.52/image cgi/JCa.cgi is executed in the image server 2 of IP address 192.168.0.52.

?ID=ABC&Pasword=123 is the argument to be processed in the CGI program.

Herein, the content ABC is transferred to the variable ID, and similarly 123 is transferred to Password.

The ID of this argument and Password can be validated by the CGI validation processing program.

That is, the client PC 3 requests the image server 2 to start JCa.cgi program thereof, and the program for validating the JCa.cgi program is executed in the image server 2. The variable ID and Password used in this processing are validated by using ABC and 123. After the validation, when the image is returned to the client PC 3, the image data can be received.

In this way, the validation data stored in the image server 1 of IP address 192.168.0.51, that is, the ID and password are transferred to the image server 2 of IP address 192.168.0.52 by way of the client. Thus, the client PC 3 and image server 2 are validated automatically.

At the time of validation, the password and other data may be ciphered.

In the image server in which the connection information corresponds not only to the IP address but also to the Domain Name System (DNS), the domain name may be used instead of the IP address.

When the image of one image server is selected out of images of plural image servers displayed on the client PC, the HTML data describing so that the selected image may be larger and other images may be smaller may be requested of the image server 1.

In the specification of the HTML data format, there is a rule for designating the image size, and the above may be realized by changing the specified value intentionally, creating and saving this altered HTML, and returning the HTML data differing in image size depending on the link change request of the HTML data by the operation information by the client.

Specifically, in FIG. 9, in the description

<img src=image/JAa.jpg width=320 height=240>

, the numerical portion of width=320 height=240 refers to the values of width and height of the image respectively, and they can be newly designated.

In FIG. 11, further, by preparing a CGI program designed to return image data of different size, the above can be realized by specifying the size.

Moreover, when the image of one image server is selected out of the images of plural image servers displayed on the client PC 3, the HTML data and image data may be requested only of the selected image server.

When creating the HTML data including information of plural connection destinations, it can be realized by designating a link destination as the HTML data presented from the image server corresponding to each image or the proper name. The link destination is determined by clicking each image or the proper name in the client.

Display presence or absence data showing whether or not to display the plural image servers may be stored in the data storage 12.

Thus, according to embodiment 1, the data storage 12 stores the connection information of plural image servers. The controller 13 of the image server 1 transmits the connection information when transmission of image data is requested from the client PC 3. The controller 31 of the client PC 3 transmits the data request signal for requesting image data to the intended image server of the plural image servers based on the received connection information. The controller 13 of the image server 1 transfers the connection information contained in the HTML data for requesting images of plural image servers of different IP address from one browser window of the client PC 3, to the browser of the client PC 3 requesting the image data to the image server 1.

Accordingly, the client PC 3 requests images of plural image servers of different IP address from one browser window, and can display plural received images on plural images.

When the data storage 12 is designed to store proper names such as places of installation of plural image servers together with the connection information of plural image servers, the proper names can be displayed on the browser window.

Besides, when the data storage 12 is designed to store passwords of plural image servers, it is not necessary to enter passwords when requesting the image of the desired image server.

Further, since the connection information is the IP address or domain name, the desired image server can be accessed securely.

The controller 31 of the client PC 3 judges which image server has been selected. Therefore, the user can observe the required image specifically in a magnified view.

Also the controller 31 of the client PC 3 judges which image server has been selected, and by requesting the image data to the selected image server, the desired image server can be selected easily and securely.

When a plurality of specific image servers are designated, the data can be classified into groups or layers, concerning the connection information of image servers, so that the image server may be designated more efficiently.

Further, as the data storage unit 12 stores the display presence or absence data showing whether or not to display images from the plural image servers, the connection information for displaying only the images of necessary image servers can be created, and unnecessary information is not displayed, so that the image display may be more efficient.

Embodiment 2

Figure 12:
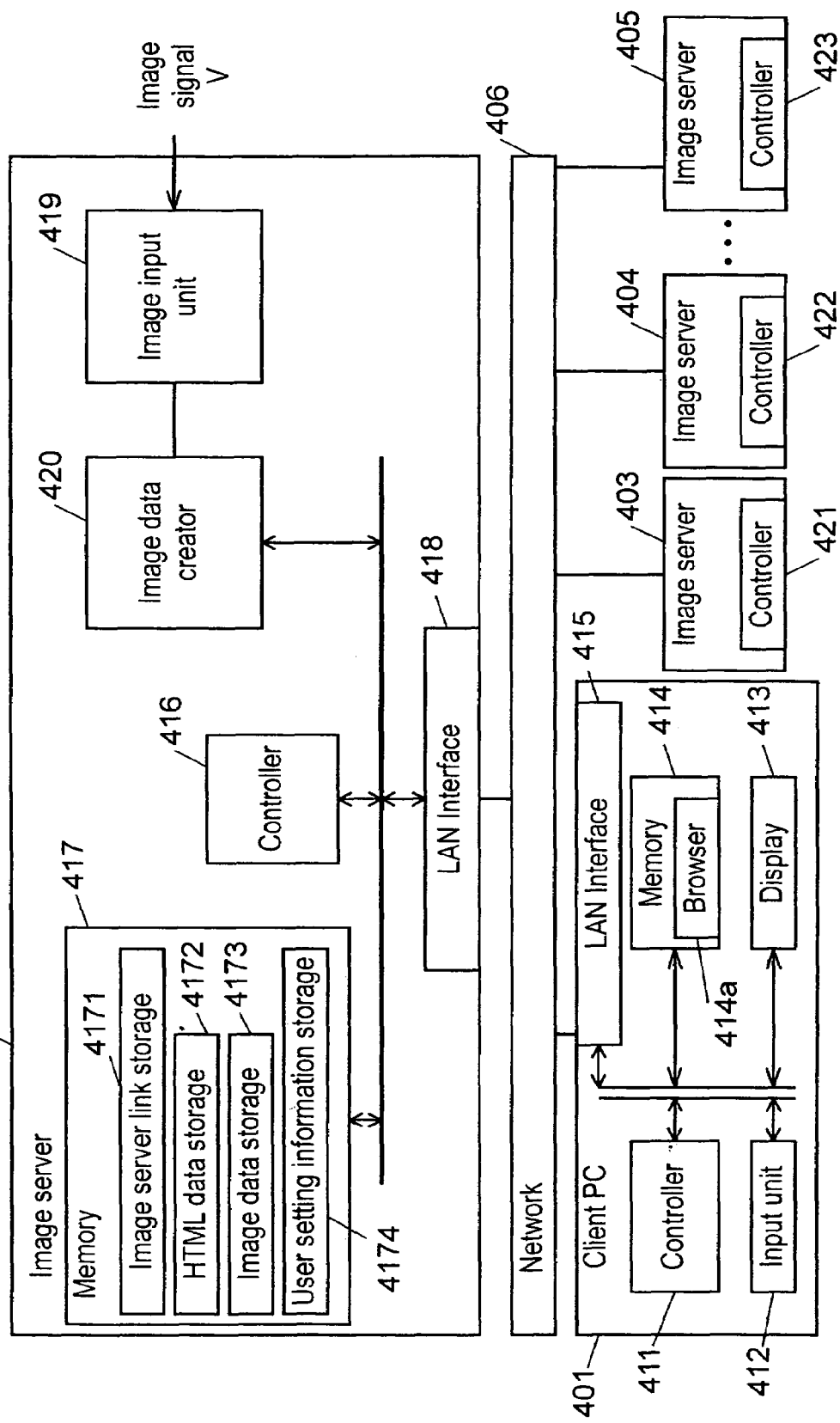
FIG. 12 is a block diagram showing a network image communication system in embodiment 2 of the invention.

FIG. 12 is a block diagram showing a network image communication system in embodiment 2 of the invention.

In FIG. 12, the network image communication system includes image servers 402, 403, 404, and 405 for storing the images taken by cameras, a client PC 401 for observing images of image servers, and a local area network (LAN) 406 for connecting them.

The image server 402 contains an image server controller 416 for controlling the entire image server 402, a memory 417 for storing various programs and data, a LAN interface unit 418 for connecting to the network 406, an image input unit for feeding image signal v taken and obtained by the camera of the image server 402, and an image data creator 420 for creating image data of JPEG or other formats from the image signal sent from the image input unit 419.

The image servers 402, 403, 404, and 405 are individually different in IP address, but identical in the structure.

The memory 417 includes an image server link storage 4171 for storing link information including address and password necessary for linking to the image servers 403 to 405, an HTML data storage 4172 for storing HTML data of display information, an image data storage 4173 for storing image data of image information, and a user setting information storage 4174 for storing various data set by the user.

The image server controllers 421, 422, and 423 control the entire image server respectively in the image servers 403, 404, and 405.

The client PC 401 is a computer manipulated by the user for displaying image data transmitted from the plural image servers, and includes a PC controller 411 for controlling the entire client PC 401, an input unit 412 for entering various data, a display unit 413 for displaying the image data transmitted from the image servers 401, etc., a memory 414 including a browser storage 414a for storing browser or other browsing software, and a LAN interface unit 415 for connecting to the network 406.

Figure 13:
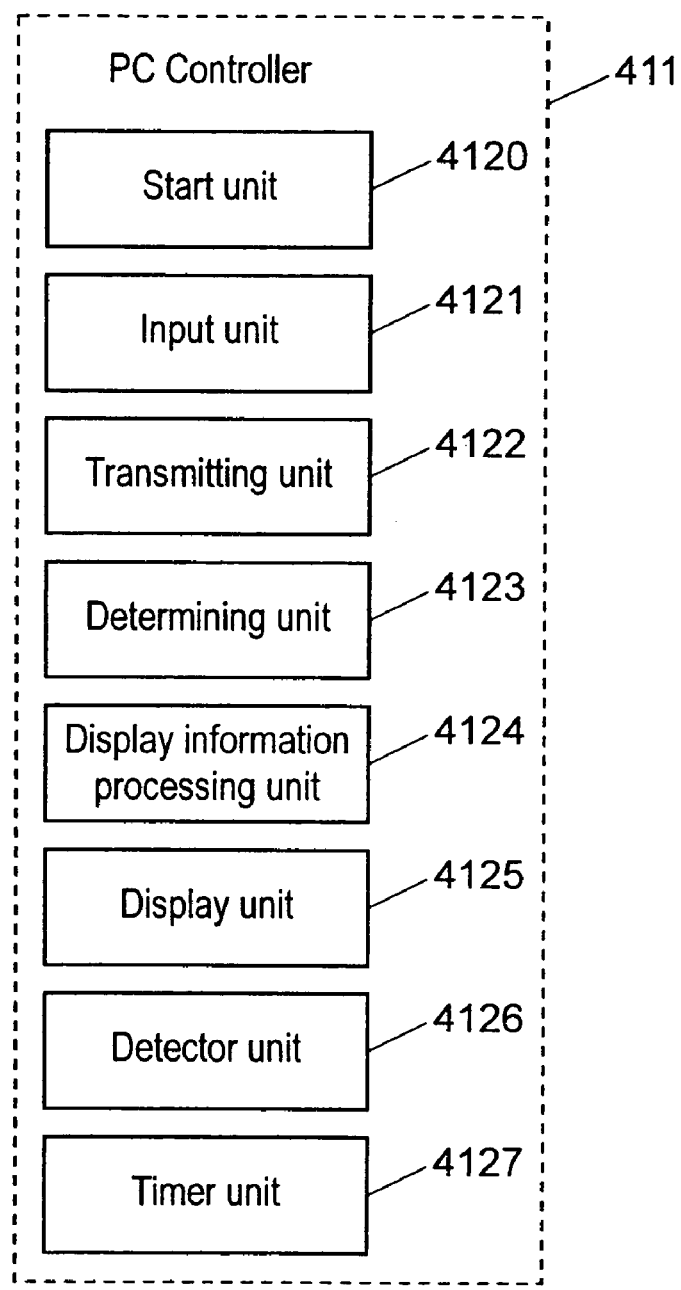
FIG. 13 is a functional block diagram for realizing the function of PC controller of client PC.

FIG. 13 is a functional block diagram for realizing the function of PC controller 411 of client PC.

In FIG. 13, the controller 411 includes a start unit 4120 for starting up the browser, etc., an input unit 4121 for manipulating and entering data, a transmitting unit 4122 for transmitting request data, etc., a determining unit 4123 for making judgement, a display information processing unit 4124 for processing display information, a display unit 4125 for displaying images on the display unit 4413, a detector unit 4126 for detecting a double click or the click position, and a timer unit 4127 for counting the timer.

Figure 14:
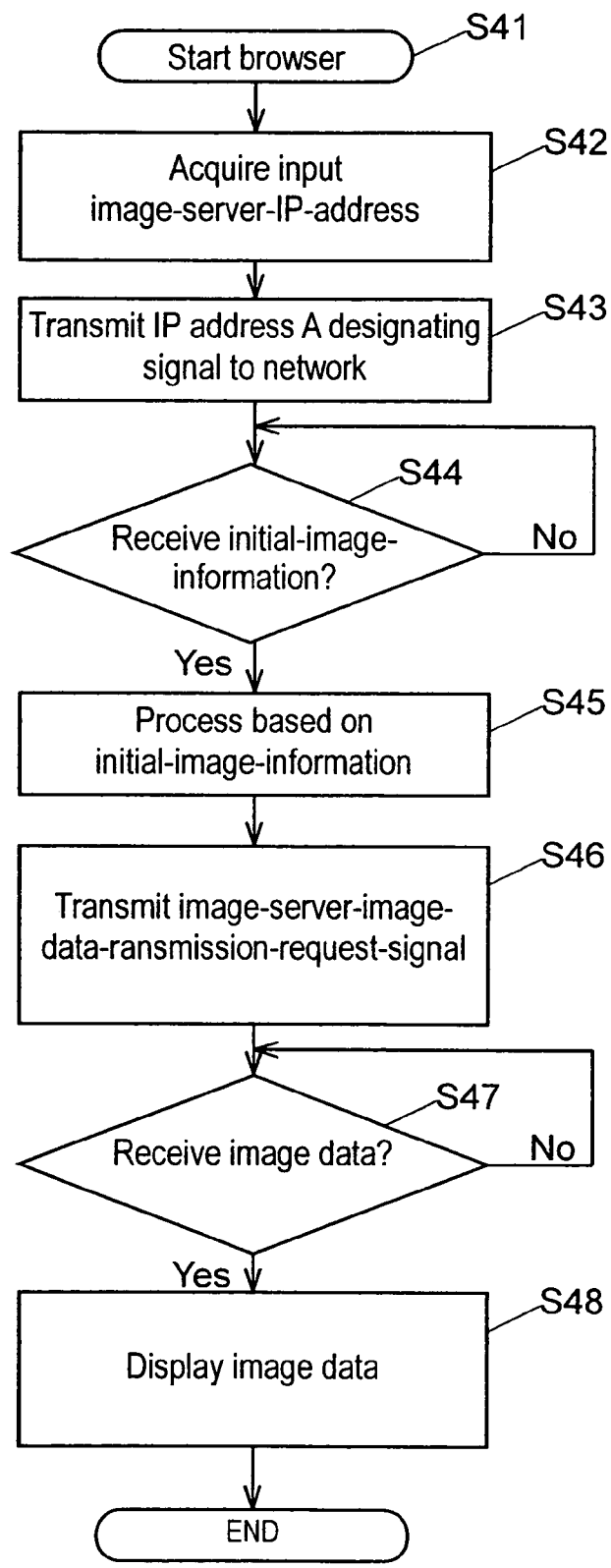
FIG. 14 is a flowchart showing display operation of initial image.
Figure 15:
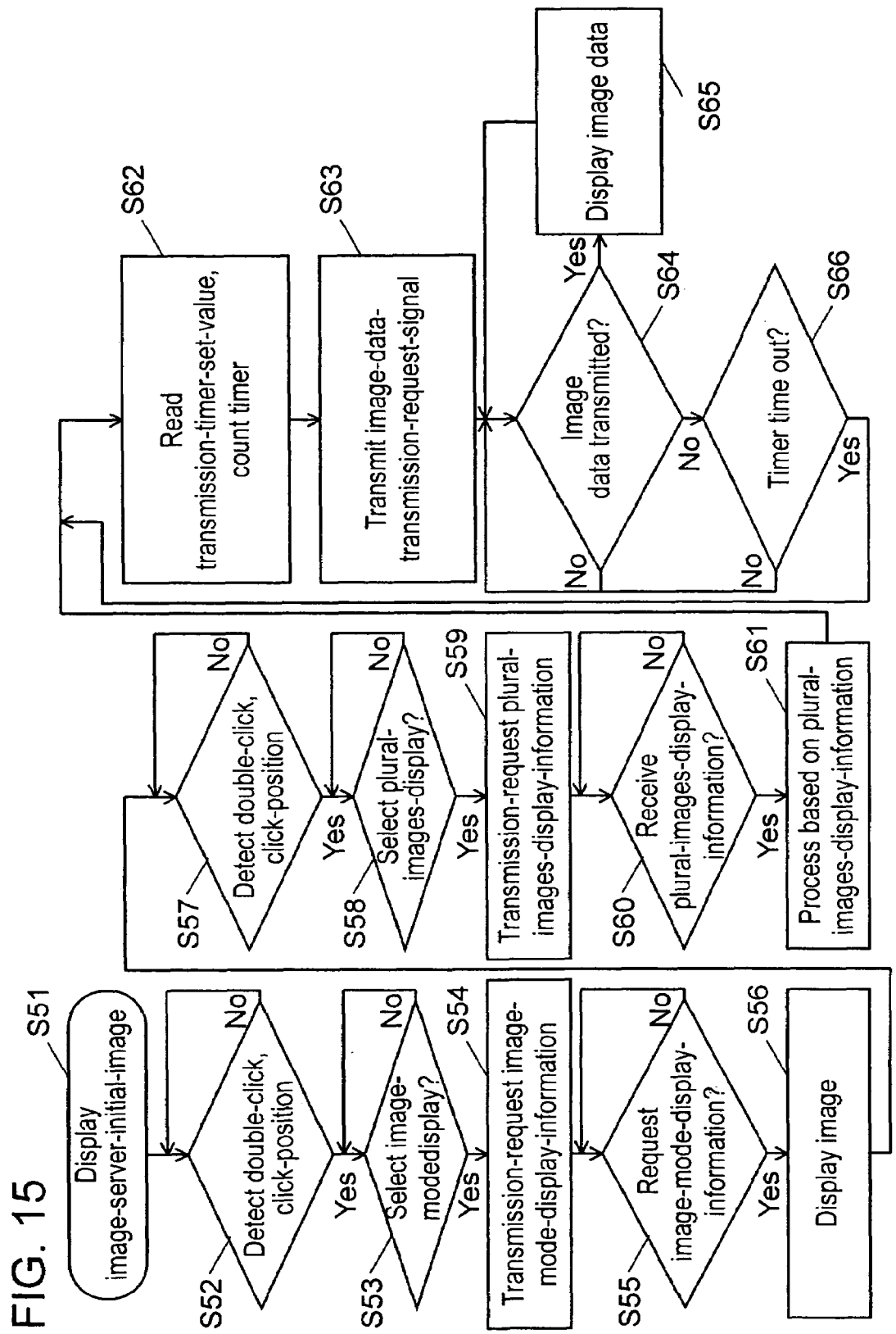
FIG. 15 is a flowchart showing display operation of plural images.

The operation of the controller 411 of the client PC 401 is explained by referring to FIG. 14 and FIG. 15.

FIG. 14 is a flowchart showing display operation of initial image, and FIG. 15 is a flowchart showing display operation of plural images.

First, the display operation of initial image is explained by referring to FIG. 14.

In FIG. 14, the start unit 4120 starts the browser (S41).

To start it, for example, the browser icon is double-clicked by the input device such as a mouse connected to the input unit 412 of the client PC 401.

When the icon is double-clicked, the detector unit 4126 detects the double click of the mouse and the click position, and runs the program execution file of the browser related to the browser icon located at the click position.

While the browser execution file is operating on the OS, when the user enters the IP address (suppose IP address A) of the image server 402 by the input unit 412, the input unit 4121 acquires the IP address A (S42).

The transmitting unit 4122 transmits the designation signal for designating the IP address A to the network 406 through the LAN interface unit 415 (S43).

When the determining unit 4123 judges that the display information of the initial image (for example, HTML format file) from the image server 402 is received through the LAN interface unit 415 (S44), the display information processing unit 4124 executes the program according to the display information of the initial image (S45).

The display information of the initial image includes the storage position information of image file, display position information of the image file, and others, and the image file is taken in according to the stored information.

Next, by a specific image read instruction command in the display information for the initial image, the transmitting unit 4122 transmits a request signal of transmission of image data to the image server 402 according to the image read instruction (S46).

When the determining unit 4123 judges that the image data is received from the image server 402 (S47), the display unit 4125 displays the received image data at a specified position on the browser image displayed on the display unit 413 according to the image file display position information in the display information of the initial image (S48).

Next, the display operation of plural images is explained by referring to FIG. 15 and FIG. 23 to FIG. 25.

Supposing the image server 402 to be the master image server and the other image servers to be slave image servers, the display operation of plural images is explained.

Figure 23:
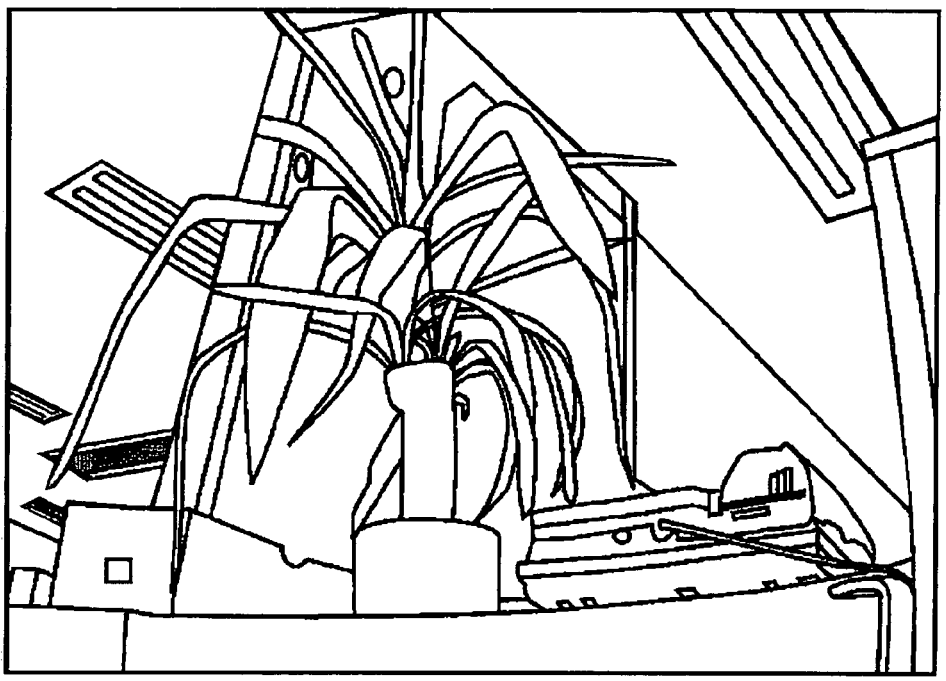
FIG. 23 is a image diagram showing an initial image.
Figure 27:
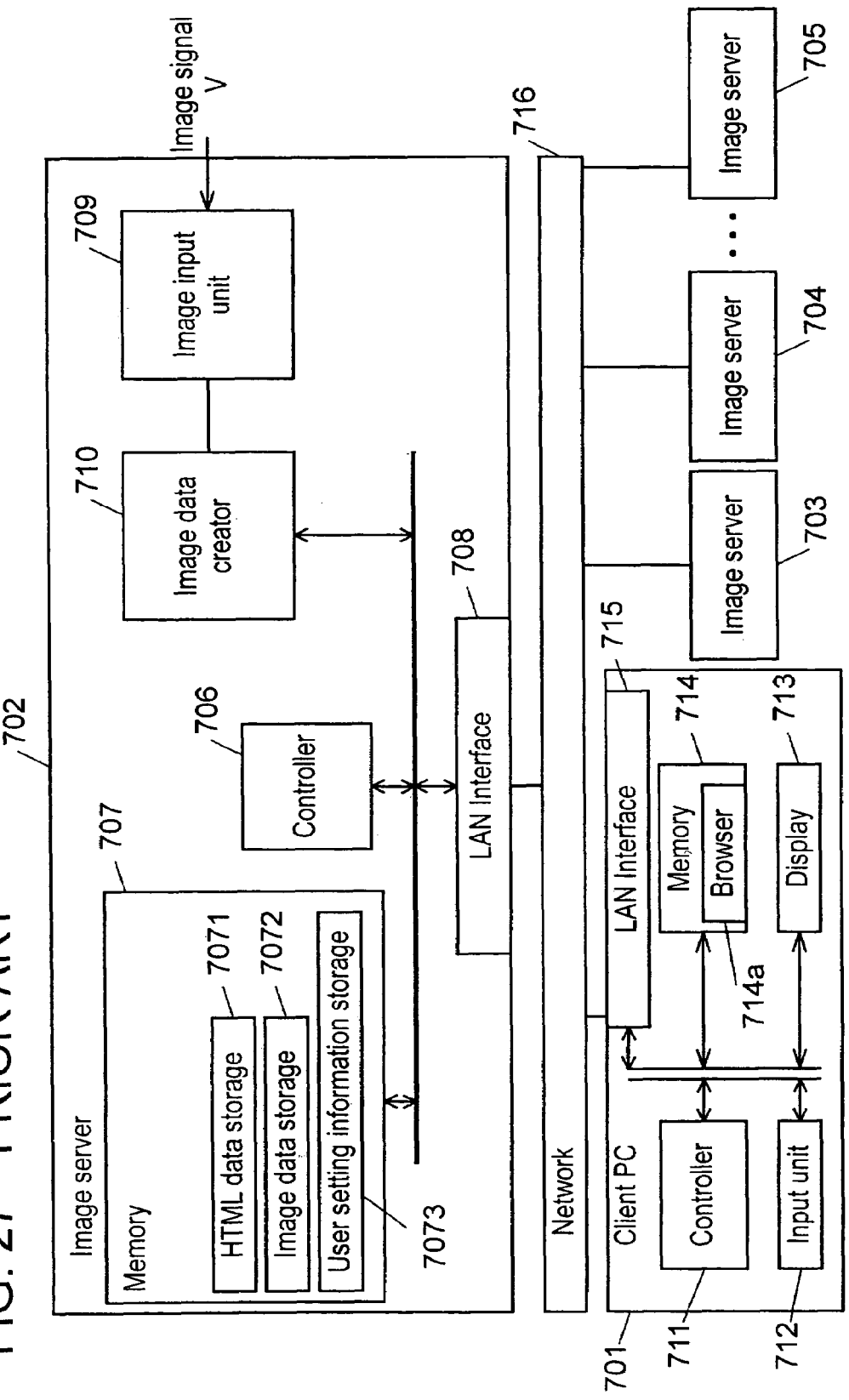
FIG. 27 is a block diagram of a conventional camera system.
Figure 28:
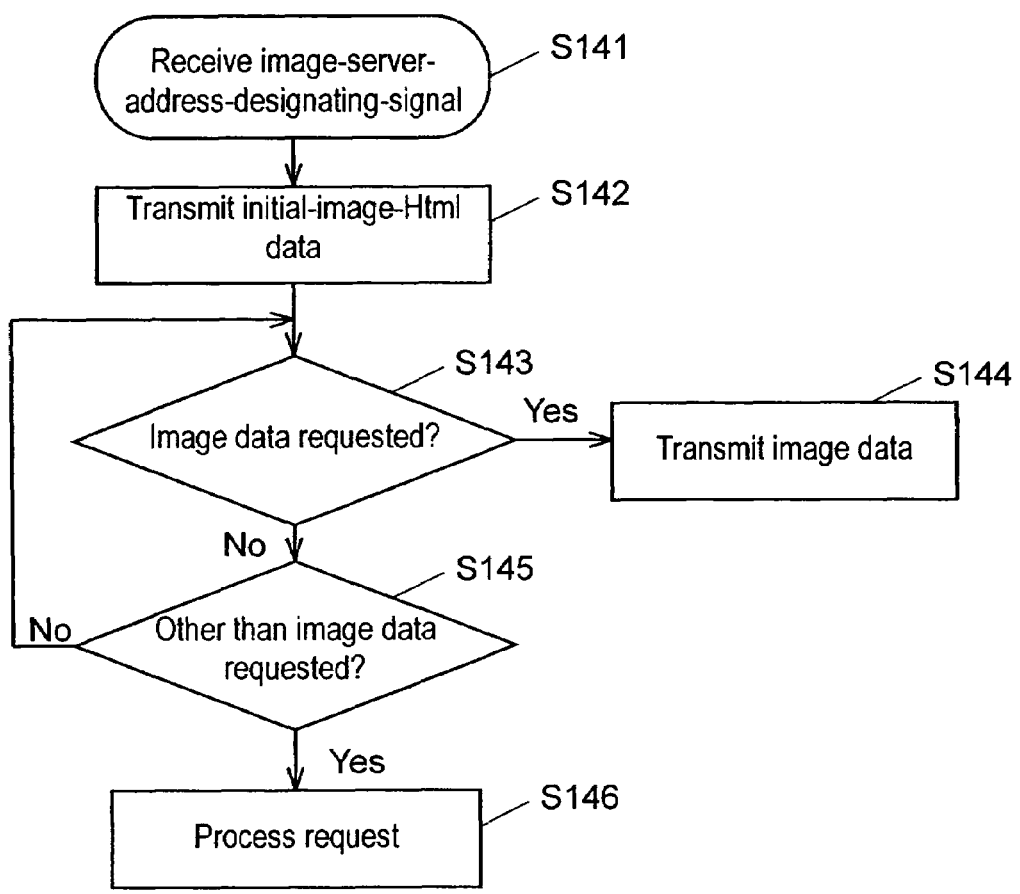
FIG. 28 is a flowchart showing operation of the conventional camera system.

FIG. 23 shows an initial image.
FIG. 24 shows a image mode display.
FIG. 25 shows a display example of plural images.

In FIG. 15, the browser of the client PC 401 displays the initial image (FIG. 23) of the image server 402 on the display unit 413 (S51).

In FIG. 23, Image Mode is double-clicked by the cursor. The detector unit 4126 detects the double click and the click position. The determining unit 4123 judges if the detector unit 4126 has detected the double click and the click position or not (S52).

If judged to be detected, it is then determined whether to select the image mode display or not (S53).

In the case of a double click of Image Mode, the image mode display is selected, and the transmitting unit 4122 transmits a request signal of transmission of display information for image mode to the image server 402 (S54).

When the determining unit 4123 judges that the display information for image mode (for example, specified HTML format data) from the image server 402 is received (S55), the image is displayed according to the display information for image mode (S56).

Next, on the image mode display information image in FIG. 24, when the user moves the cursor to the position of Several Picture, and double-clicks, the detector unit 4126 detects it. When the determining unit 4123 judges that the detector unit 4126 has detected the double-click of Several Picture and the click position (S57), it is then determined whether or not to select the display of plural images (S58). "Several Picture" means selection of display of plural images, and the transmitting unit 4122 transmits a request signal of transmission of display information for plural images to the image server 402 (S59).

When the determining unit 4123 judges that the display information for plural images (for example, specified HTML format data) from the master image server 402 is received (S60), the display information processing unit 4124 takes in the image data according to the display information for plural images (S61).

Next, the timer unit 4127 reads the transmission timer set value in the transmission request signal of image data for plural images in the display information for plural images, and starts counting the timer (S62).

The transmitting unit 4122 transmits a image data transmission request signal to the image server 402 according to the image read instruction in the display information for plural images (S63).

When the determining unit 4123 judges that image data is transmitted from the image server 402 (S64), the display unit 4125 displays the image data at the specified position on the browser image of the display unit 413 according to the display information for plural images (S65).

The process returns to step S64 before the timer expires, and returns to step S62 when the timer expires (S66).

The display information for plural images includes the storage position information of plural image data (image files) and display position information of the image data, and the image data is taken in according to the storage information.

In this embodiment, four images are displayed on the image. Two examples of display of four images are shown (at the position of Several Picture in FIG. 24).

The storage position of four images is the image server 402, and the transmitting unit 4122 transmits a transmission request of each image data. When receiving the image data from the image server 402 (for example, Jpeg file as still image compressed data), the image is displayed on the browser image of the display unit 413 according to each display information of plural images. Specific display examples are shown in FIG. 25.

The operation of the image server 402 is explained.

Figure 16:
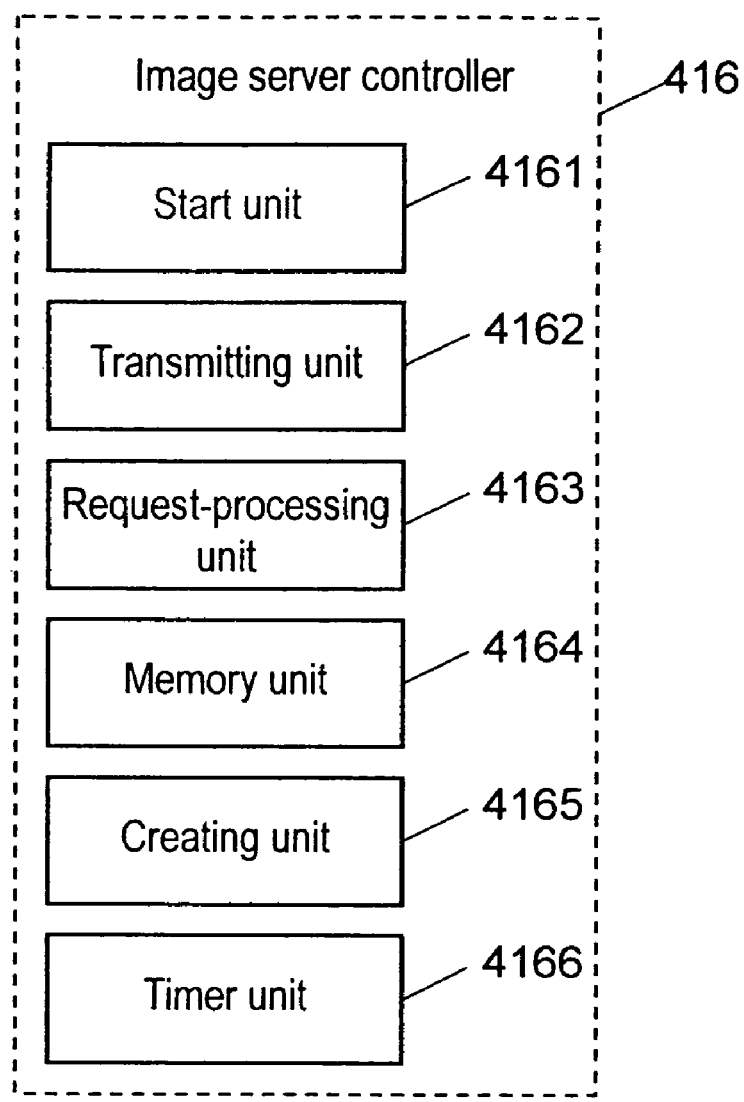
FIG. 16 is a functional block diagram showing the controller of image server.

FIG. 16 is a functional block diagram of controller 416 of image server 402. In FIG. 16, the image server controller 416 includes a determining unit 4161 for making judgements, a transmitting unit 4162 for transmitting through the LAN interface unit 418, a request processing unit 4163 for processing requests from the client PC 401 and other terminal devices, a memory unit 4164 for writing and reading in the memory 417, a creating unit 4165 for creating display information necessary for display in the client PC 401, and a timer unit 4166 for counting the time.

The operation of the image server controller 416 is explained by referring to FIG. 17 to FIG. 20, and FIG. 26.

Figure 17:
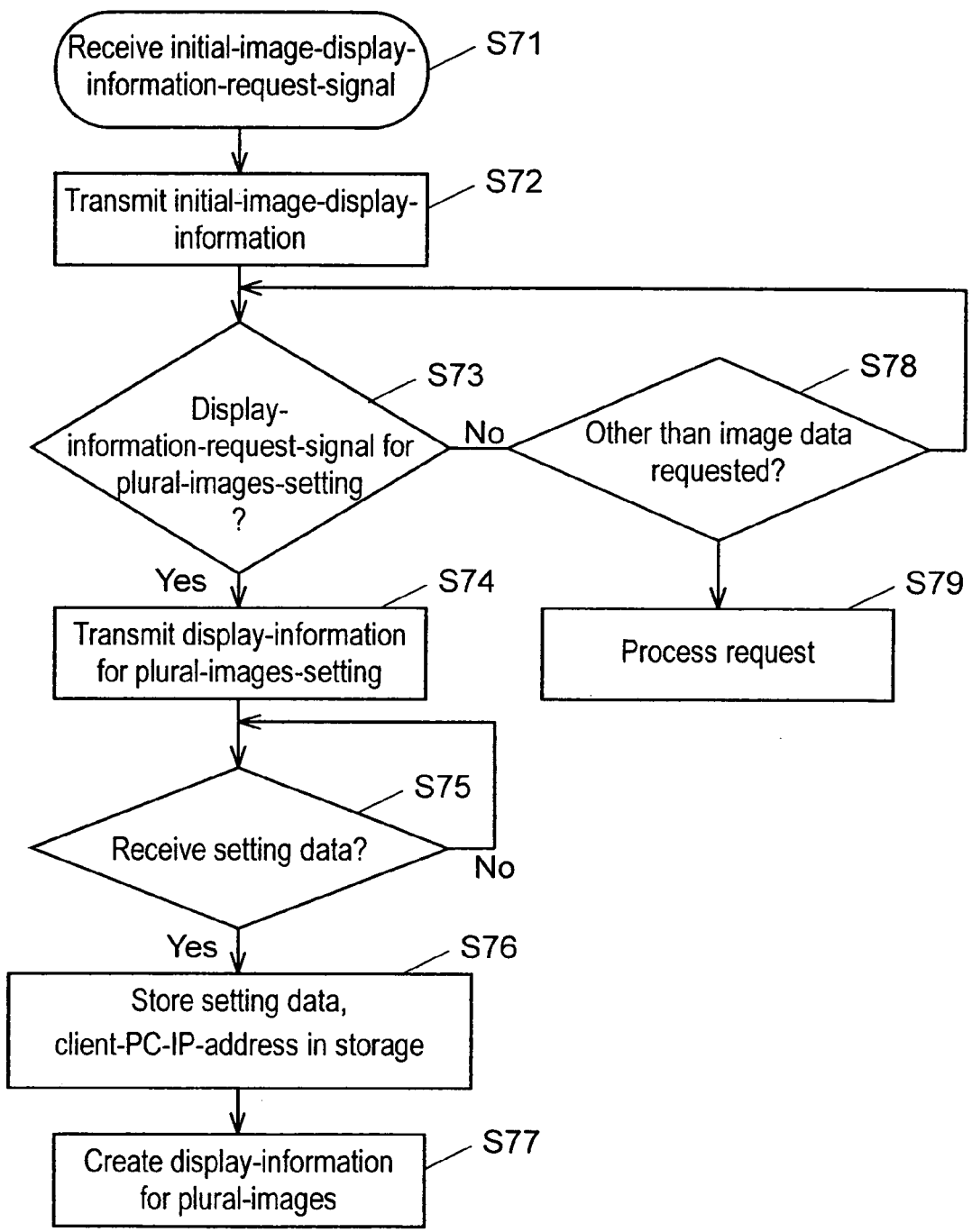
FIG. 17 is a flowchart showing setting operation preliminarily required for displaying plural images in client PC.

First, setting operation for plural images is explained by referring to FIG. 17 and FIG. 26.

FIG. 17 is a flowchart showing setting operation (setting operation for plural images) preliminarily required for displaying plural images in client PC 401. FIG. 26 shows a setting image of plural images.

When the determining unit 4161 judges that the image server 1 has received the display information request signal for initial image of the client PC 401 (S71), the transmitting unit 4162 transmits the display information for initial image to the client PC 401 (S72).

When receiving such display information for initial image, the image as shown in FIG. 23 is displayed in the client PC 401.

On the initial image of FIG. 23, when the user of the client PC 401 selects Initial Setting, a setting request signal of plural images is transmitted to the image server 402. At this time, the determining unit 4161 judges if the setting request signal for plural images of the client PC 401 has been received or not (S73).

If judged to be received, the transmitting unit 4162 transmits display information for setting plural images to the client PC 401 (S74).

When receiving the display information for setting plural images, the image as shown in FIG. 26 is displayed in the client PC 401.

On this image, the user enters the IP addresses of other image servers, the passwords, and the imager server names within a square frame from the input unit 412 by using the keyboard.

When displaying on plural images, Enable is entered, and when not displaying, Disable is entered from the input unit 412 by using the keyboard.

When the user selects Several Image Page on the image, the setting data of plural images entered from the client PC 401 is transmitted to the image server 402.

The determining unit 4161 judges if the setting data of plural images is received from the client PC 401 or not (S75), and if judged to be received, the memory unit 4164 stores the setting data of plural images of the client PC 401 and IP address of the client PC 401 by relating to each other in the memory 417 in FIG. 12 (S76).

The display information for plural images is created in the HTML format, and stored in the memory 417 (S77).

In embodiment 2, it is designed to store the setting data of plural images and IP address of client PC 401 by relating each other.

This method is convenient when there are plural client PCs because the plural images can be set individually in each client PC.

Alternatively, if desired to refer to plural images set by one arbitrary client PC from any client PCs, the setting data of plural images and IP address may be stored without relating each other.

In the setting data for plural images, the IP address of the original image server taking the image data of plural images and others are set. This setting is necessary for starting operation for taking in the images from the image servers 403, 404, 405, when a display request for plural images is sent from the client PC 401 to the image server 402.

At step S73, when the determining unit 4161 judges that there is not setting request signal of plural images from the client PC 401, and judges that request of other than image data is sent from the client PC 401 (S78), the request processing unit 4163 processes the request from the client PC 401 (S79).

The initial image display operation of the image server 402 having security is explained.

Figure 18:
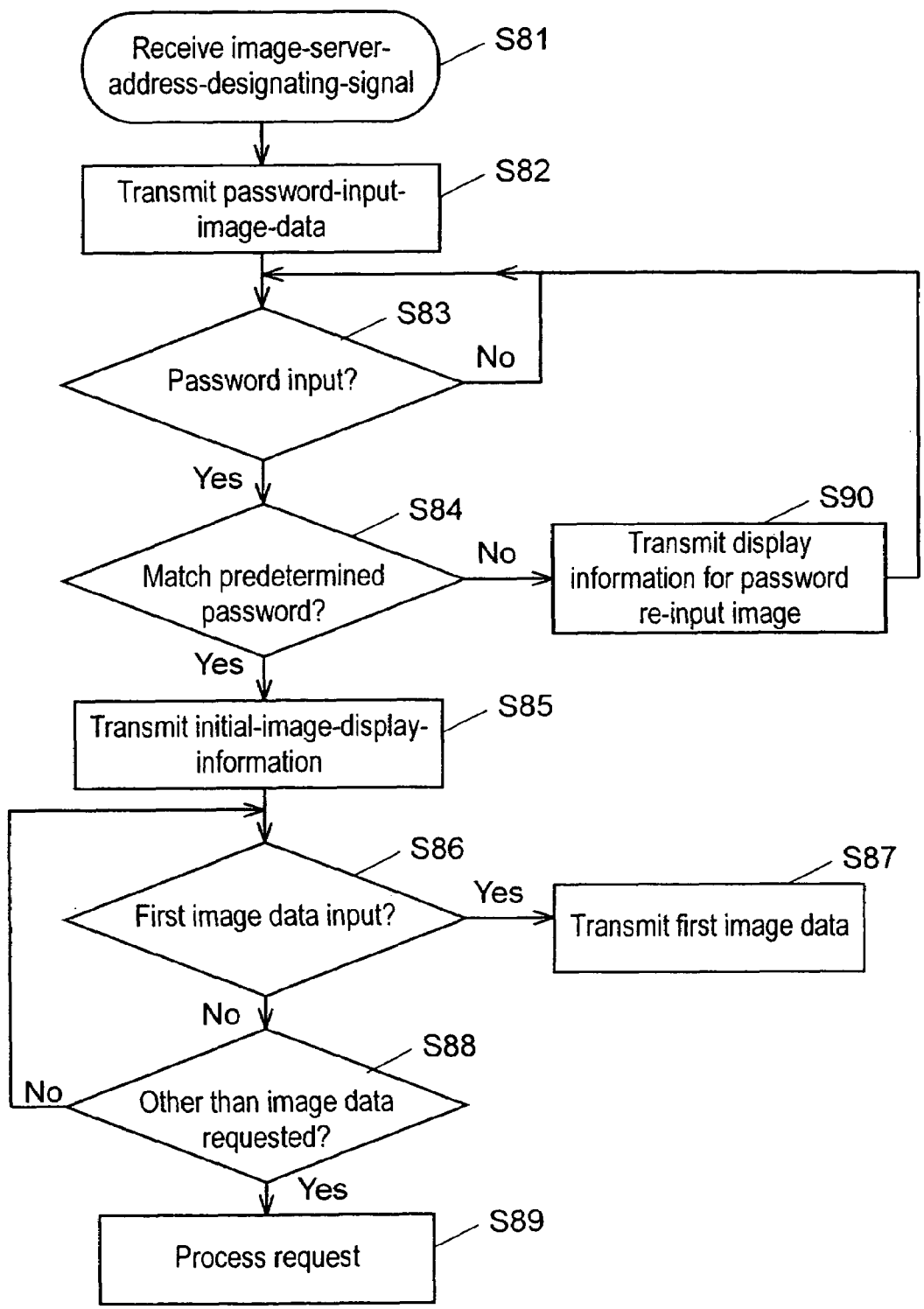
FIG. 18 is a flowchart showing display operation of initial image for displaying an initial image in client PC.

FIG. 18 is a flowchart showing initial image display operation for displaying an initial image in client PC 401.

In FIG. 18, first, when the determining unit 4161 judges that a designation signal for designating the address of the camera (not shown in FIG. 12) of the image server 402 is received from the client PC 401 (S81), the transmitting unit 4162 transmits display information for password input image described in specified HTML format to the IP address of the client PC 401 through the LAN interface unit 418 and network 406 (S82).

Next, the determining unit 4161 judges if the password is entered from the client PC 401 or not (S83). When the determining unit 4161 judges it is entered, the unit 4161 determines whether or not it coincides with the predetermined password stored in the user setting information storage 474 in FIG. 12 (S84).

If the determining unit 4161 judges coincidence, the transmitting unit 4162 takes out the display information for initial image (predetermined HTML data) from the memory 417, and transmits it to the IP address of the client PC 401 (S85).

Further, when the determining unit 4161 judges first image data is requested from the client PC 401 (S86), the transmitting unit 4162 takes out the first image data corresponding to the request (for example, compressed still image data in Jpeg format) from the image data storage 473, and transmits the data to the client PC 401 (S87).

At step S86, if judged first image data is not requested, the determining unit 4161 judges if request of other than image data is sent from the client PC 401 or not (S88), and judged other than image data is requested, this request from the client PC 401 is processed (S89).

At step S84, if judged not to coincide with the predetermined password, the transmitting unit 4162 transmits display information for re-input image to the client PC 401 (S90).

Transmission of image data for plural images to the client PC is explained below.

Figure 19:
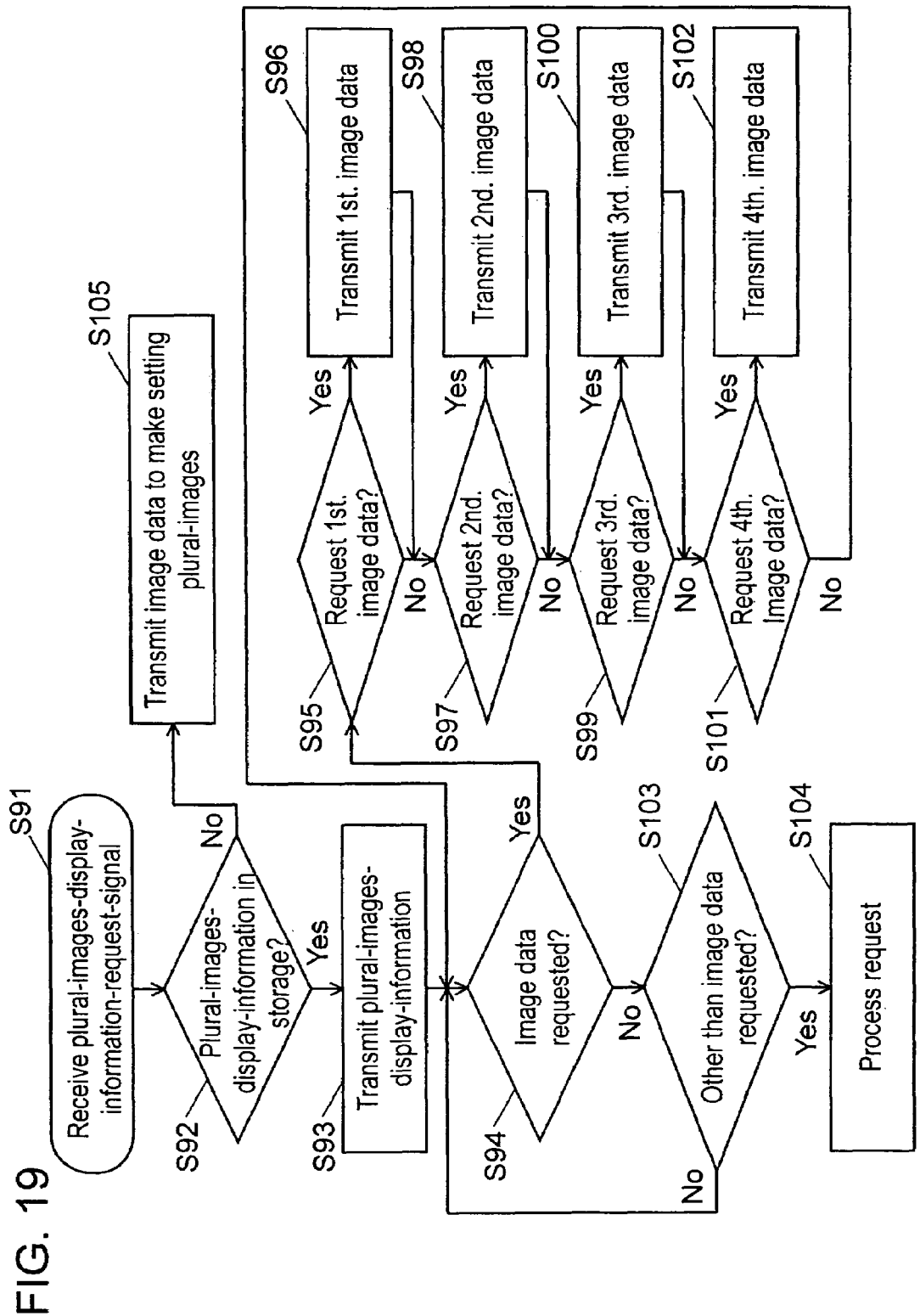
FIG. 19 is a flowchart showing operation for transmitting image data for plural images to client PC.

FIG. 19 is a flowchart showing operation for transmitting image data for plural images to client PC 401.

In FIG. 19, when the determining unit 4161 of the image server 402 judges a request signal for plural images is received from the client PC 401 (S91), the determining unit 4161 further judges if there is display information for plural images in the memory 417 or not (S92).

When the determining unit 4161 judges there is display information for plural images, the transmitting unit 4162 transmits the display information for plural images to the client PC 401 (S93). The determining unit 4161 further judges if image data is requested from the client PC 401 or not (S94).

When the determining unit 4161 judges to be requested, the transmitting unit 4162 takes out first to fourth image data according to the request from the image data storage 473, and transmits the data to the client PC 401 (S95 to S102).

The image data request signal from the client PC 401 includes the image file name. The image data coinciding with the image file is transmitted to the client PC 401. The image file of the image server 402 is stored as 001.jpg, and image files of other image servers 403 to 405 are stored as 002.jpgg to 004.jpg, respectively, in the image data storage 473. Therefore, the individual data are transmitted sequentially.

At step S94, if judged image data is not requested, the determining unit 4161 judges if request of other than image data is made or not (S103), and if judged to be requested, the request processing unit 4163 processes the request from the client PC 401 (S104).

At step S92, if judged there is no display information for plural images in the memory 417 in FIG. 12, the transmitting unit 4162 transmits display information for image for urging setting of plural images to the client PC 401 (S105).

Operation of receiving image data for plural images from other image servers 403, 404, and 405 is explained.

Figure 20:
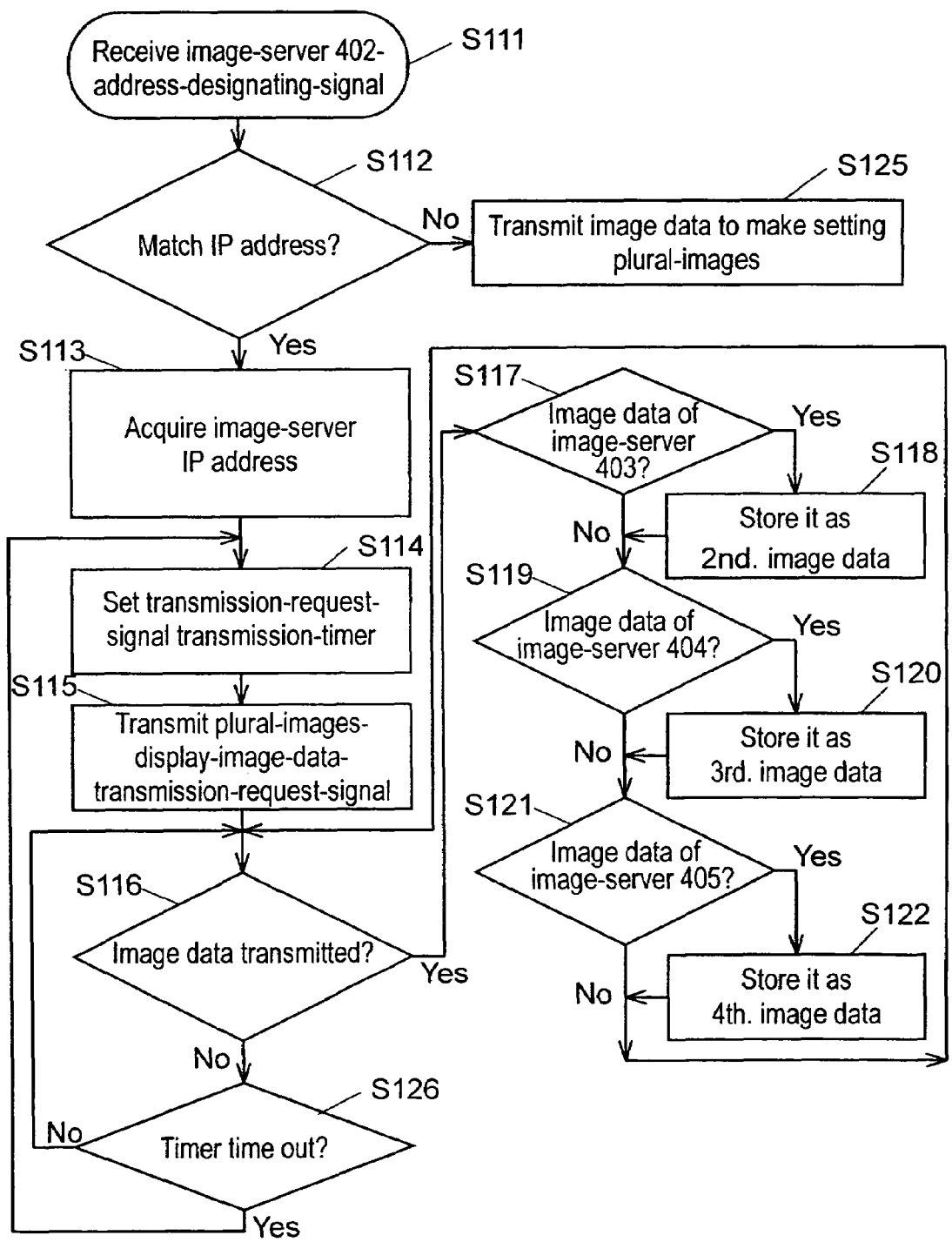
FIG. 20 is a flowchart showing operation of receiving image data for plural images from another server.

FIG. 20 is a flowchart showing operation of receiving image data for plural images from other server.

In FIG. 20, first, when the determining unit 4161 judges reception of IP address designation signal of the image server 402 from the client PC 401 (S111), then the determining unit 4161 judges whether or not the received IP address of the client PC 401 coincides with the predetermined IP address of the client PC 401 which is the display destination of plural images (S112).

When the determining unit 4161 judges coincidence, the memory unit 4164 reads out the preset IP addresses of the image servers 403, 404, 405 from the image server link information storage 171 of the memory 417 (S113), and the timer unit 4166 sets a transmission timer in the image data transmission request signal for plural images to the image servers 403, 404, 405 (S114), then the transmitting unit 4162 transmits the data transmission request signal for plural images to each one of the image servers 402, 404, 405 (S115).

Next, when the determining unit 4161 judges transmission of image data from the image servers 403, 404, 405 (S116), the memory unit 4164 stores the image data of the image server 404, 404, or 405 as the second, third, or fourth image data in the image data storage 473 of the memory 417 (S117 to S122).

At step S112, if the IP address of the image server 402 does not coincide with the predetermined IP address of the client PC 401, the transmitting unit 4162 transmits image data for urging setting of plural images to the client PC 401.

As shown at steps S116 and S117, it is designed to wait for transmission of image data from the image servers 403, 404, 405, for the time set at step S114.

Figure 21:
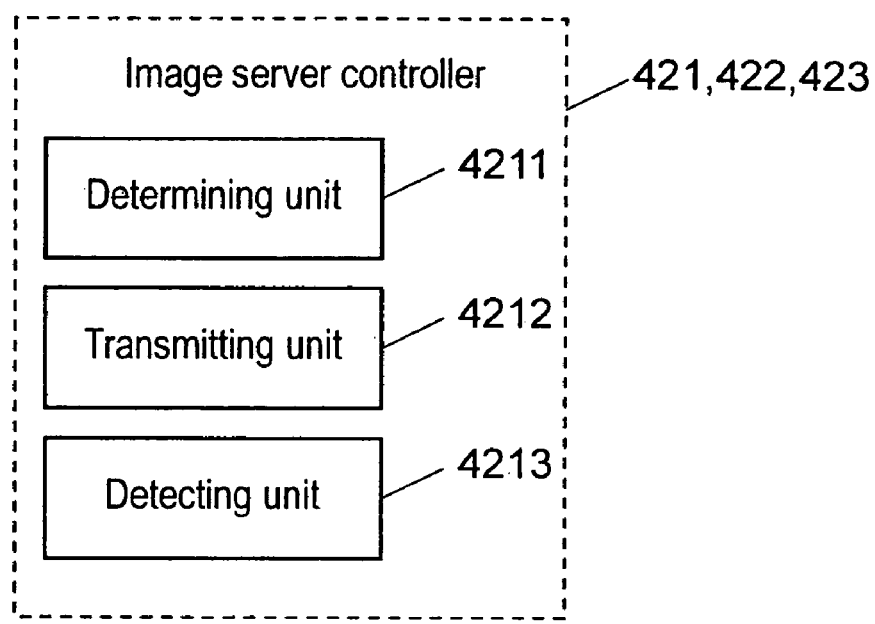
FIG. 21 is a functional block diagram showing portions for realizing the function in image server controllers 421, 422, and 423.

FIG. 21 is a functional block diagram showing the portion for realizing the function in image server controllers 421, 422, and 423.

In FIG. 21, the image servers 403, 404, 405, that is, slave image server controllers 421, 422, 423 (called slave image server controllers collectively) include individually a determining unit 4211 for making judgements, a transmitting unit 4212 for transmitting through the LAN interface unit, and a detecting unit 4213 for detecting the image size value from the image data request signal.

Figure 22:
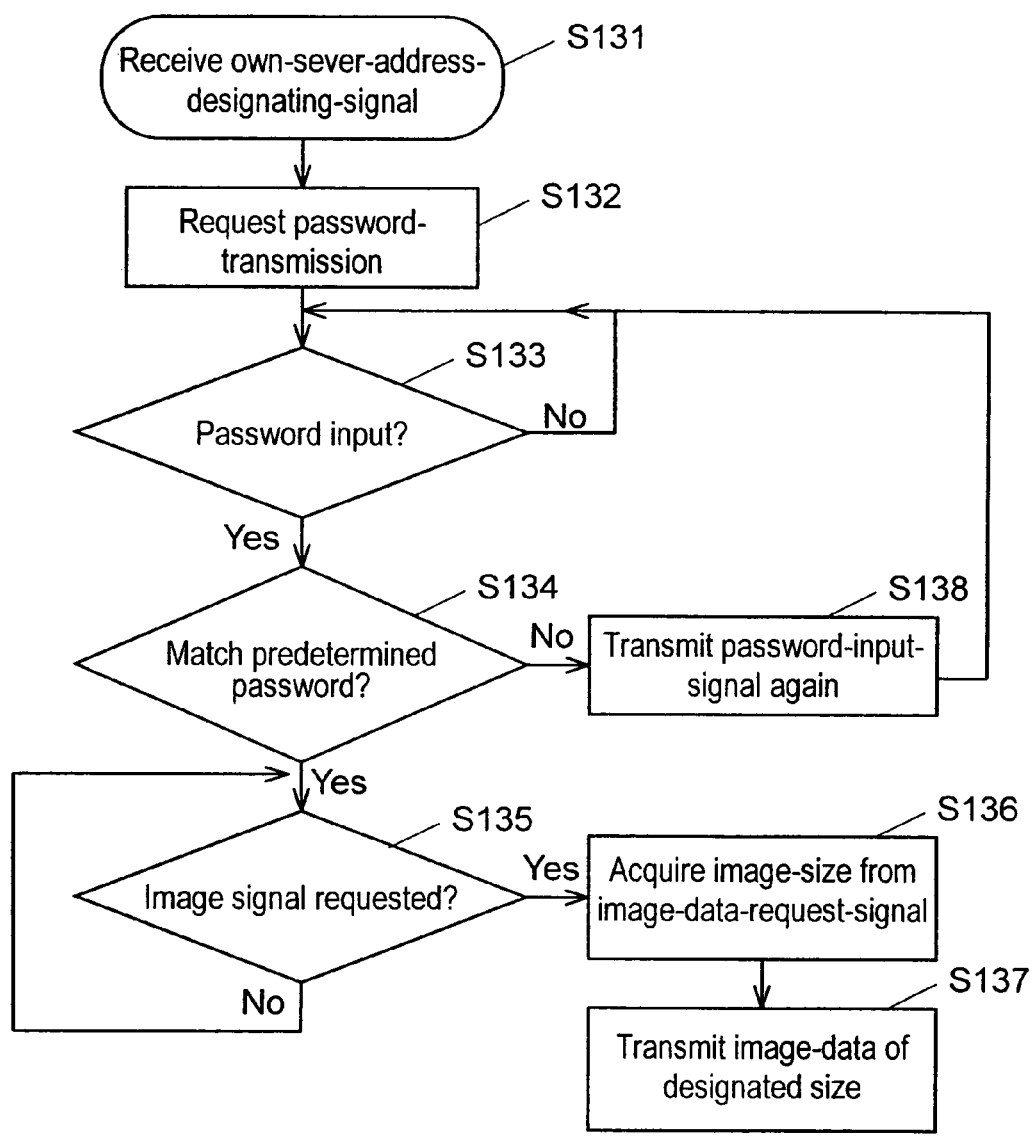
FIG. 22 is a flowchart showing a method of transmitting image data for displaying plural images to image servers.

In relation to the image server 402, the operation of image servers 403, 404, and 405 is explained by referring to FIG. 22.

FIG. 22 is a flowchart showing a method of transmitting image data for displaying plural images to the image server 402.

In FIG. 22, the determining unit 4211 judges if the slave image server has received or not the own IP address designation signal from the image server 402 (registered as master image server) (S131).

If judged to be received, the transmitting unit 4212 requests transmission of a password to the image server 402 (S132).

Next, the determining unit 4211 judges whether the password is entered from the image server 402 or not (S133).

When the determining unit 4211 judges the input, it further judges if the entered password coincides or not with the password stored in the memory of the slave image server (having the same function as the memory 417 of the master image server) (S134), and if judged to coincide, it is judged if image data is requested from the image server 402 or not (S135).

If judged to be requested, the detecting unit 4213 detects the image size value from the image data request signal (S136), and the transmitting unit 4212 transmits the image data of the image size of specified value detected at step S136 to the image server 402 (S137).

In this embodiment, by double-clicking any image of the image servers 402, 403, 404, and 405 displayed on the screen of the display unit 413 of the client PC 401, the image size can be preset so as to display the double-clicked image on the full display area or in a magnified view.

For example, when the image of the image server 404 displayed on the screen of the client PC 401 is double-clicked, the image size of the image server 404 is increased, and the image size of the other image servers 402, 403, and 405 is decreased, by setting the image size value in the image data request signal.

Or when the images of the image servers 402, 403, 404 and 405 displayed on the screen of the display unit 413 of the client PC are double-clicked, it may be set to link to the image server of the double-clicked image.

In this case, the operation is easier by storing the password information in the display information for plural images so that validation of password is not needed when transferring from the image server 402 to other image server.

In the embodiment, the image data of the image server 402 and the image servers 403, 404, and 405 are stored individually in the image data storage 473, but the combined images of plural image data may be stored in the image data storage 473.

Further, by double-clicking the image of the slave camera, out of the image of the master IP camera of the master image server 402 and the image of the slave IP camera of the slave image server displayed on the screen of the display unit 413 of the client PC, the image data of the slave IP camera is read out from the memory 417 of the image server 402, and the read-out image may be displayed on the entire screen.

In this case, the image data for divided screen and image data for full screen need to be stored in the image data storage 473 of the image server 402.

Moreover, in FIG. 12, the image server 402 is related to the other image servers 403, 404, and 405, but the image server 403, etc. may be related to the image server 402.

Thus, according to embodiment 2, a group of varied plural image servers can be formed, and a combination of plural images to be displayed can be freely selected.

It is also possible for a link to transfer easily to the image server at the link destination by displaying the link destination of the image servers 403, 404, and 405 on the screen of the image server 402, or displaying the link destination of the image server 402 on the screen of the image servers 403, 404, and 405.

By transferring the image data for divided screens from the image servers 403, 404, and 405 to the image server 402 only when the image server 402 is accessed, the quantity of data flowing in the LAN interface unit can be decreased.

As described herein, in embodiment 2 of the invention, the PC controller 411 of the client PC 401 includes the display unit 4125 for displaying the image according to the display information for image mode transmitted from the image server 402, the determining unit 4123 for judging whether or not the display of plural images is selected on the displayed image, and the display information processing unit 4124 for determining the display position of the image data according to the display information for plural images from the image server 402. When the determining unit 4123 judges that the image of plural image is selected and the image data is transmitted from the image server 402, the display unit 4125 displays the image at the specified position on the browser screen according to the display information for plural images.

According to the display information for plural images from the image server 402, plural image data are displayed on the browser image. Therefore, by transmitting the image data of the image server 402, and the image servers 403, 404, and 405 stored in the memory 417 from the image server 402 to the client PC 401 as required, the plural image data of the IP cameras can be displayed simultaneously on the screen of the client PC 401 by using the versatile browser.

The image server 402, when the IP address of the image server 402 is specified, reads out the link information from the image server link information storage 4171, and requests other image servers to transmit the image data thereof specified by the link information, and when the image data is transmitted from the other image servers, the transmitted image data is stored in the image data storage 473. Therefore, if requested from the client PC 401, the plural storage image data can be transmitted immediately.

As explained herein, according to the invention, the image server, when receiving a predetermined request from the client PC through the network, transmits at least the display information except for the image data to the client PC. Further, the image server can receive the image data from other plural image servers. Therefore, the image server can transmit both the own image data and the other image data to the request from the client PC.

Further, when image data transmission is requested from the client PC, the image server transmits the own image data and also image data of other received image servers to the client PC. Therefore, the image server can transmit both the own image data and the image data of other image servers, so that the user of the client PC does not have to access each one of the plural image servers.

Moreover, by creating the display information so that the image data transmission request may be made based on the display information, the information may be stored so as to request the own image data to the own image server and other image data. Therefore, the individual image data may be stored in the memory separately without forming in one image information.

The client PC requests transmission from one image server, and this image server transmits the image information containing the own image data and image data of one or plural other image servers, so that image data of plural image servers can be displayed on the screen of the client PC. Hence, the user does not have to access each one of the plural image servers.

When an instruction designating one taken image out of plural taken images displayed on the client PC is entered from the input unit of the client PC, image data of magnified image size of one taken image is transmitted to the client PC, so that the user can see one particular image out of plural images in a magnified size by operating as specified.

Together with this method, by a method of reducing the image size as for other taken images than the particular image, and transmitting image data to the client PC, the user observes simultaneously the particular image out of plural images displayed on the browser window in a magnified size and other images in a reduced size in a combined image by operating as specified.

When one taken image is specified from plural taken images displayed on the client PC, if the display information is created so as for a predetermined request to transmit to the image server which is the source taking the specified requested taken image, the image server which is the source taking the image can be linked directly with the client PC. Therefore, if the user does not desire to see other images, only the taken image of one image server can be displayed, and it can be displayed in a wider area than in the case of display of plural images.

When the password information of the image server which is the designated source of taking an image is included in the display information, even if the password is necessary when accessing each image server, it is possible to communicate with other image servers continuously without using password after communicating with one image server, so that the convenience is enhanced.

Besides, when the display information is created so that the link destination of the imager server which is the source taking plural taken images displayed on the client PC may be displayed on the client PC, it is possible for the client PC to link to the destination immediately, by the input unit of the client PC.

Since the link destination of each image server is displayed on the browser of the client PC, the user can link to the camera of the desired image server easily by one operation without having to designate the address.

What is claimed is:

1. An image server, comprising:
a camera configured to capture image data;
an interface configured to be connected to a terminal apparatus and to another image server via a network;
a controller configured to:
transmit to the terminal apparatus predetermined screen data, the predetermined screen data being utilized for setting destination information of the another image server, the destination information of the another image server being utilized for accessing the another image server;
receive from the terminal apparatus the destination information of the another image server, the destination information of the another image server being set into the predetermined screen data at the terminal apparatus and generate predetermined HTML data utilized for displaying on the terminal apparatus the image data captured by the camera, the predetermined HTML data including a predetermined description, the predetermined description instructing the terminal apparatus to access the another image server based on the destination information of the another image server in order to obtain, from the another image server, another image data captured by the another image server.

2. The image server according to claim 1, wherein the controller further transmits the predetermined HTML data to the terminal apparatus, whereby the terminal apparatus can access the another image server based on the destination information of the another image server included in the predetermined HTML data to obtain, from the image server, image data captured by the camera of the image server.

3. The image server according to claim 1, wherein the camera is discrete from the image server.

4. The image server according to claim 1, wherein the destination information of the another image server comprises an IP address of the another image server apparatus.

5. The image server according to claim 1, wherein the destination information of the another image server comprises a domain name of the another image server apparatus.

6. The image server according to claim 1, wherein the predetermined HTML data includes another predetermined description, the another predetermined description being utilized for setting a name of the another image server into the predetermined screen data.

7. The image server according to claim 1, wherein the predetermined HTML data includes a predetermined description, the predetermined description being utilized for selecting whether to display on the terminal apparatus the image data captured by the another image server.

8. A method for accessing an image server from a terminal apparatus, the image server capturing image data and being connected to the terminal apparatus via a network, the terminal apparatus being connected to another image server via the network, the method comprising;

transmitting, from the terminal apparatus to the terminal apparatus, predetermined screen data, the predetermined screen data being utilized for setting destination information of the another image server, the destination information of the another image server being utilized for accessing the another image server;

receiving, at the image server from the terminal apparatus, the destination information of the another image server, the destination information of the another image server being set into the predetermined screen data at the terminal apparatus;

generating predetermined HTML data utilized for displaying on the terminal apparatus the image data captured by the camera, the predetermined HTML data including a predetermined description, the predetermined description instructing the terminal apparatus to access the another image server based on the destination information of the another image server to obtain, from the another image server, another image data captured by the another image server; and transmitting the predetermined HTML data to the terminal apparatus, whereby the terminal apparatus can access the another image server based on the destination information of the another image server included in the HTML data.

* * * * *